(12) United States Patent
Jannard et al.

(10) Patent No.: US 9,581,736 B2
(45) Date of Patent: Feb. 28, 2017

(54) LIQUID OPTICS IMAGE STABILIZATION

(71) Applicant: BLACKEYE OPTICS, LLC., Eastsound, WA (US)

(72) Inventors: James H. Jannard, Las Vegas, NV (US); Iain A. Neil, Massagno (CH)

(73) Assignee: BLACKEYE OPTICS, LLC., Eastsound, WA (US)

(*) Notice: Subject to any disclaimer, the term of this patent is extended or adjusted under 35 U.S.C. 154(b) by 0 days.

(21) Appl. No.: 14/231,085

(22) Filed: Mar. 31, 2014

(65) Prior Publication Data
US 2014/0211312 A1  Jul. 31, 2014

Related U.S. Application Data

(62) Division of application No. 12/327,666, filed on Dec. 3, 2008, now Pat. No. 8,687,281.

(60) Provisional application No. 60/992,284, filed on Dec. 4, 2007.

(51) Int. Cl.
| G02B 3/14 | (2006.01) |
| G02B 15/16 | (2006.01) |
| G02B 26/00 | (2006.01) |
| G02B 27/64 | (2006.01) |

(52) U.S. Cl.
CPC .............. *G02B 3/14* (2013.01); *G02B 15/16* (2013.01); *G02B 26/004* (2013.01); *G02B 27/646* (2013.01)

(58) Field of Classification Search
CPC .......... G02B 3/12; G02B 3/14; G02B 26/005; G02B 26/004; G02B 15/16; G02B 27/646
USPC .................. 359/665–667, 678, 683, 689
See application file for complete search history.

(56) References Cited

U.S. PATENT DOCUMENTS

| 3,161,718 A | 12/1964 | De Luca et al. |
| 3,366,437 A | 1/1968 | Moriyama et al. |
| 4,407,567 A | 10/1983 | Michelet et al. |
| 4,784,479 A | 11/1988 | Ikemori |
| 4,871,240 A | 10/1989 | Suda |
| 5,315,435 A | 5/1994 | Horiuchi |
| 6,070,016 A | 5/2000 | Kaneda |
| 6,166,864 A | 12/2000 | Horiuchi |
| 6,369,954 B1 | 4/2002 | Berge et al. |
| 6,449,081 B1 | 9/2002 | Onuki et al. |

(Continued)

FOREIGN PATENT DOCUMENTS

| CN | 1397025 A | 2/2003 |
| CN | 1705901 A | 12/2005 |

(Continued)

OTHER PUBLICATIONS

Notice of Allowance in Chinese Application No. 200880118070.X dated Apr. 1, 2013.*

(Continued)

*Primary Examiner* — Zachary Wilkes
(74) *Attorney, Agent, or Firm* — Knobbe, Martens, Olson & Bear, LLP

(57) ABSTRACT

A lens system suitable for use with a camera is disclosed. The lens system employs liquid optics to provide stabilization of an image. A liquid lens cell provides stabilization of the image. A second liquid lens cell may provide stabilization in another direction. A third liquid lens cell may liquid lens cells may provide compensation for changes in the focus position.

18 Claims, 35 Drawing Sheets

(56) References Cited

U.S. PATENT DOCUMENTS

| | | |
|---|---|---|
| 6,459,535 B1 | 10/2002 | Goto |
| 6,538,823 B2 | 3/2003 | Kroupenkine et al. |
| 6,674,473 B1 | 1/2004 | Takada |
| 6,702,483 B2 | 3/2004 | Tsuboi et al. |
| 6,781,622 B1 | 8/2004 | Sato et al. |
| 6,906,867 B2 | 6/2005 | Nagata |
| 6,924,944 B2 | 8/2005 | Sekiyama |
| 6,934,090 B2 | 8/2005 | Nagaoka et al. |
| 6,936,809 B2 | 8/2005 | Viinikanoja |
| 6,950,245 B2 | 9/2005 | Nishioka et al. |
| 6,952,313 B2 | 10/2005 | Schrader |
| 6,961,188 B2 | 11/2005 | Betensky et al. |
| 6,965,480 B2 | 11/2005 | Kroupenkine |
| 6,987,529 B1 | 1/2006 | Ito |
| 6,992,700 B1 | 1/2006 | Sato et al. |
| 7,006,299 B2 | 2/2006 | Kroupenkine |
| 7,126,903 B2 | 10/2006 | Feenstra et al. |
| 7,142,368 B2 | 11/2006 | Kim et al. |
| 7,218,429 B2 | 5/2007 | Batchko |
| 7,224,534 B2 | 5/2007 | Ootsuka |
| 7,227,682 B2 | 6/2007 | Caldwell et al. |
| 7,230,771 B2 | 6/2007 | Kuiper et al. |
| 7,253,966 B2 | 8/2007 | Saori |
| 7,265,911 B2 | 9/2007 | Goosey, Jr. et al. |
| 7,317,580 B2 | 1/2008 | Kogo et al. |
| 7,324,287 B1 * | 1/2008 | Gollier .................... G02B 3/14 359/665 |
| 7,382,545 B2 | 6/2008 | Jung et al. |
| 7,403,344 B2 | 7/2008 | Xu et al. |
| 7,408,717 B2 | 8/2008 | Renders et al. |
| 7,413,306 B2 | 8/2008 | Campbell |
| 7,466,493 B2 | 12/2008 | Kim et al. |
| 7,855,838 B2 | 12/2010 | Jannard |
| 8,027,096 B2 | 9/2011 | Feng et al. |
| 8,154,805 B2 | 4/2012 | Jannard et al. |
| 8,169,709 B2 | 5/2012 | Jannard et al. |
| 8,638,496 B2 | 1/2014 | Jannard et al. |
| 8,687,281 B2 | 4/2014 | Jannard et al. |
| 8,773,766 B2 | 7/2014 | Jannard et al. |
| 8,879,161 B2 | 11/2014 | Jannard et al. |
| 2002/0176148 A1 | 11/2002 | Onuki et al. |
| 2004/0021953 A1 | 2/2004 | Betensky et al. |
| 2004/0227063 A1 | 11/2004 | Viinikanoja |
| 2005/0113912 A1 | 5/2005 | Feenstra et al. |
| 2005/0200973 A1 | 9/2005 | Kogo et al. |
| 2005/0225877 A1 | 10/2005 | Tang |
| 2006/0028734 A1 | 2/2006 | Kuiper et al. |
| 2006/0045504 A1 | 3/2006 | Zarnowski et al. |
| 2006/0047039 A1 | 3/2006 | Kato et al. |
| 2006/0067663 A1 | 3/2006 | Kita |
| 2006/0072019 A1 | 4/2006 | Stavely et al. |
| 2006/0106426 A1 | 5/2006 | Campbell |
| 2006/0126190 A1 | 6/2006 | Berge et al. |
| 2006/0227415 A1 | 10/2006 | Caldwell et al. |
| 2006/0256429 A1 | 11/2006 | Obrebski et al. |
| 2007/0041101 A1 | 2/2007 | Goosey, Jr. et al. |
| 2007/0153399 A1 | 7/2007 | Hendriks et al. |
| 2007/0247727 A1 | 10/2007 | Kim |
| 2007/0263293 A1 | 11/2007 | Batchko et al. |
| 2008/0088756 A1 | 4/2008 | Tseng et al. |
| 2009/0141365 A1 | 6/2009 | Jannard et al. |
| 2009/0185281 A1 | 7/2009 | Hendriks |
| 2011/0058258 A1 | 3/2011 | Wang et al. |
| 2011/0211262 A1 | 9/2011 | Craen et al. |
| 2012/0281295 A1 | 11/2012 | Jannard et al. |
| 2014/0254025 A1 | 9/2014 | Jannard et al. |
| 2014/0285883 A1 | 9/2014 | Jannard et al. |
| 2015/0055224 A1 | 2/2015 | Jannard et al. |

FOREIGN PATENT DOCUMENTS

| | | |
|---|---|---|
| CN | 101208627 A | 6/2008 |
| CN | 101268399 A | 9/2008 |
| CN | 102388325 A | 3/2012 |
| CN | 102388332 A | 3/2012 |
| CN | 200880110582.1 | 10/2013 |
| CN | 200880111594.6 | 2/2014 |
| EP | 2 071 367 A1 | 6/2009 |
| EP | 2 208 095 A1 | 7/2010 |
| EP | 2 217 958 A1 | 7/2010 |
| EP | 2 217 960 A2 | 8/2010 |
| IN | 81/7/CHENP/2011 A | 3/2013 |
| JP | 59-116712 | 7/1984 |
| JP | 60-254014 | 12/1985 |
| JP | 63-208817 | 8/1988 |
| JP | 01-129221 | 5/1989 |
| JP | 6-160779 | 6/1994 |
| JP | 09-138345 | 5/1997 |
| JP | 2001-249261 | 9/2001 |
| JP | 2003-057410 | 2/2003 |
| JP | 2004-312239 | 11/2004 |
| JP | 2004-333640 | 11/2004 |
| JP | 2004-356175 | 12/2004 |
| JP | 2006-064947 | 3/2006 |
| JP | 2007-094170 | 4/2007 |
| JP | 2007-121821 | 5/2007 |
| JP | 2008-170874 | 7/2008 |
| KR | 10-2005-0059291 A | 6/2005 |
| KR | 10-2005-0033308 A | 12/2005 |
| KR | 10-2007-0103812 A | 10/2007 |
| TW | 2004-20910 A | 10/2004 |
| TW | 200420910 A | 10/2004 |
| TW | 2005-533953 A | 10/2005 |
| TW | 2006-32364 A | 9/2006 |
| TW | 200632364 A | 9/2006 |
| TW | 2007-30911 A | 8/2007 |
| TW | 200730911 A | 8/2007 |
| TW | 2007-36851 A | 10/2007 |
| TW | 200736851 A | 10/2007 |
| TW | 200533953 A | 10/2014 |
| WO | WO 01/55766 | 8/2001 |
| WO | WO 2004/038480 A1 | 5/2004 |
| WO | WO 2004/083899 | 9/2004 |
| WO | WO 2004/083899 A2 | 9/2004 |
| WO | WO 2005/069042 A1 | 7/2005 |
| WO | WO 2005/073778 | 8/2005 |
| WO | WO 2006/103290 A1 | 10/2006 |
| WO | WO 2006/110283 A2 | 10/2006 |
| WO | WO 2008/010124 A1 | 1/2008 |
| WO | WO 2009/048725 A1 | 4/2009 |
| WO | WO 2009/073387 A1 | 6/2009 |
| WO | WO 2009/073388 A2 | 6/2009 |
| WO | WO 2010/117628 A2 | 10/2010 |
| WO | WO 2010/117731 A2 | 10/2010 |

OTHER PUBLICATIONS

"Liquid Lens Mass Production", Consumer Electronics Industry, Aug. 30, 2006.

"Liquid Lenses for Camera Phones", Roland Piquepaille's Technology Trends, http://www.primidi.com/2004/12/02.html, Dec. 2, 2004 in 2 pages.

"Liquid zoom lenses to be available in camera phones before the end of 2005", Cameras and Imaging, http://www.gizmag.com/go/3922/, Apr. 9, 2005—2 pages.

Lyon, "Varioptic to Enforce Liquid Lens Patent Rights", Varioptic Newsletter—Mar. 2004, Mar. 17, 2004 in 2 pages.

Neil, "Compound zoom lenses", Panavision International, L.P., 2005 in 10 pages.

"Optical solution", The Economist Newspaper and the Economist Group, http://www.economist.com/PrinterFriendly.cfm?story id=9571244, Jul. 31, 2007 in 2 pages.

Opto & Laser Europe, "Liquid lenses eye commercial breakthrough", http://optics.org/articles/ole/8/11/2/1, Nov. 2003 in 5 pages.

Zubgy, "Liquid Lenses, Small variable-focus fluid lens elements", Dec. 8, 2006 in 16 pages Office Action in Japanese Application No. 2010-528925 mailed Feb. 19, 2013.

International Search Report and Written Opinion mailed Feb. 2, 2009 in related International Application No. PCT/US2008/077086 in 14 pages.

(56) References Cited

OTHER PUBLICATIONS

Office Action in Japanese Application No. 2010-528925 mailed Aug. 20, 2013.
Office Action in European Application No. 08837077.1 dated Sep. 26, 2012.
Office Action in Chinese Application No. 200880110582.1 dated Feb. 26, 2013.
Exam Report in Australian Application No. 2008311114 dated Jan. 31, 2013.
First Office Action in Australian Application No. 2008331642 dated Mar. 22, 2013.
Office Action in Chinese Application No. 200880111594.6 dated May 13, 2013.
Office Action in Chinese Application No. 200880111594.6 mailed Aug. 27, 2012.
International Search Report of PCT Application No. PCT/US2008/084232 mailed Feb. 23, 2009 in 7 pages.
Written Opinion of PCT Application No. PCT/US2008/084232 mailed Feb. 23, 2009 in 6 pages.
Office Action in Japanese Application No. 2010-536971 dated May 14, 2013.
Office Action in Japanese Application No. 2010-536972 dated May 21, 2013.
Partial International Search Report of PCT Application No. PCT/US2008/084233 mailed Apr. 14, 2009 in 7 pages.
Office Action in Chinese Application No. 200880118070 dated Jan. 18, 2012.
International Search Report of PCT Application No. PCT/US2008/084233 mailed Jul. 3, 2009 in 10 pages.
First Office Action in Australian Application No. 2008331643 dated Feb. 19, 2013.
Written Opinion of PCT Application No. PCT/US2008/084233 mailed Jul. 3, 2009 in 9 pages.
Second Office Action in Chinese Application No. 200880118070.X dated Jan. 10, 2013.
Office Action in European Application No. 10762108.8 dated Apr. 10, 2013.
International Search Report of PCT Application No. PCT/US2010/028421 mailed Dec. 17, 2010 in 9 pages.
Supplementary European Search Report in European Application No. 10762108.8 mailed Aug. 17, 2012.
Office Action in Australian Application No. 20100234963 dated May 24, 2013.
Office Action in Chinese Application No. 201080016155.4 dated Jul. 3, 2013.
International Search Report and Written Opinion in PCT/US2010/029069 International Publication No. WO 2010/117731 A2) dated Oct. 26, 2010.
Supplementary European Search Report in European Application No. 10762153.4 mailed Aug. 17, 2012.
Office Action in Chinese Application No. 201080016154.X dated Jun. 6, 2013.
Final Decision of Rejection in Japanese Application No. 2010-528925 mailed Feb. 4, 2014.
Office Action in Taiwan Application No. 097137750 dated Nov. 7, 2013.
Second Office Action in Australian Application No. 2008331642 dated Apr. 1, 2014.
Notice of Rejection in Japanese Application No. 2010-536971 dated Feb. 4, 2014.
Office Action in European Application No. 0885235.8 dated Jan. 2, 2014.
Office Action in Japanese Application No. 2010-536972 dated Feb. 25, 2014.
Office Action in Australian Application No. 2008331643 dated Feb. 20, 2014.
Office Action in European Application No. 08857959.4 dated Jan. 2, 2014.
Office Action in European Application No. 10762108.8 dated Oct. 24, 2013.
First Office Action in Japanese Application No. 2012-504699 dated Dec. 10, 2013.
Exam Report in Australian Application No. 2010234888 dated Dec. 4, 2013.
Office Action in Japanese Application No. 2012-504706 dated Dec. 10, 2013.
Geary, J.: Introduction to Lens Design: With Practical ZEMAX Examples, Center for Applied Optics, Richmond, VA, p. 23, 2002.
International Search Report and Written Opinion mailed Dec. 17, 2010, from International Application No. PCT/US2010/028421, filed Mar. 24, 2010, 9 pages.
International Search Report and Written Opinion mailed Oct. 26, 2010, from International Application No. PCT/US2010/029069, filed Mar. 29, 2010, 8 pages.

\* cited by examiner

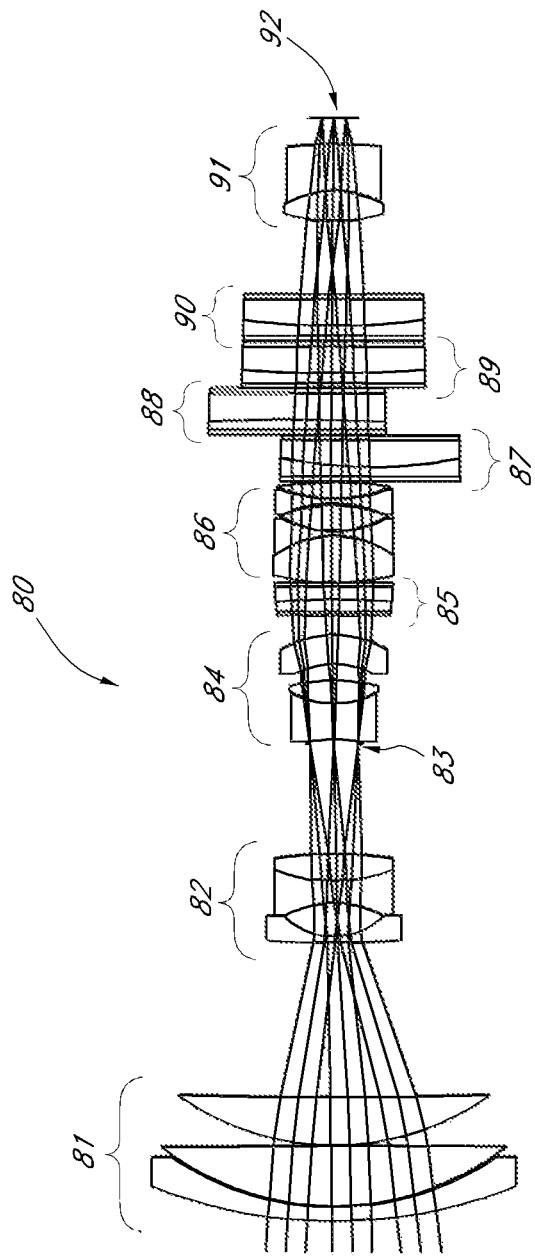

LIQUID OPTICS IMAGE STABILIZATION

RELATED APPLICATIONS

This application is a divisional of U.S. patent application Ser. No. 12/327,666, entitled "Liquid Optics Image Stabilization," filed Dec. 3, 2008 (set to issue as U.S. Pat. No. 8,687,281 on Apr. 1, 2014); which claims the benefit of priority of U.S. Prov. App. No. 60/992,284 filed Dec. 4, 2007. The entirety of each application referenced in this paragraph is hereby incorporated by reference herein and made a part of the present specification.

BACKGROUND

Field of the Invention

This invention relates to an optical lens system employing liquid optics to stabilize an image.

Description of the Related Art

Optical image stabilization varies an optical path in a lens to stabilize an image reaching a sensor. For example, a floating lens element may be moved orthogonally to the optical axis of the lens. Alternatively, mechanical image stabilization moves the sensor capturing the image to counteract the motion of the camera. However, these image stabilization devices rely upon mechanical movement of lens elements or sensors.

SUMMARY

Liquid lens cells can modify an optical path without relying upon mechanical movement of the liquid cell, thereby providing vibration compensation to stabilize an image. A liquid lens cell can be used with other lens elements aligned along at least two optical axes.

In one embodiment, the liquid lens cell comprises first and second contacting liquids, wherein a contacting optical surface between the contacting liquids has a variable shape that is substantially symmetrical to its own optical axis and is asymmetrical to at least one other optical axis. A plurality of lens elements and the liquid lens cell are configured to collect radiation emanating from an object side space and provide at least partial stabilization of radiation delivered to an image side space.

Two or more liquid lens cells may be configured to provide further stabilization of radiation delivered to an image side space. For example, two liquid lens cells may be used to stabilize an image in a single linear direction. The stabilization may correct, for example, horizontal or vertical jitter.

In another embodiment, four or more liquid lens cells are configured to provide stabilization of radiation delivered to an image side space. Two of the liquid lens cells may provide stabilization in one direction, while another two liquid lens cells provide stabilization in another direction. The four or more liquid lens cells can together provide stabilization in any direction.

A liquid lens cell comprising first and second contacting liquids may be configured so that a contacting optical surface between the contacting liquids has a variable shape that is substantially symmetrical relative to an optical axis of the liquid lens cell. A plurality of lens elements could be aligned along a common optical axis and arranged to collect radiation emanating from an object side space and delivered to an image side space. The liquid lens cell could be inserted into an optical path formed by the plurality of lens elements that are aligned along the common optical axis. The optical axis of the liquid lens cell could be parallel to the common optical axis, or it could be at an angle to the common optical axis.

An electronic control system may be used to control the variable shape of the contacting optical surface in a liquid lens cell. An accelerometer, laser gyroscope, or the like may be used to detect movement of one or more lens elements, and the shape of the contacting optical surface may then be varied to compensate for the movement of the lens elements in order to stabilize the image.

The control system may be configured to detect panning of the camera, so that the image shift due to the panning is not corrected. The control system may also be configured to compensate for various types of movement. For example, the control system may compensate for vibration having a frequency greater than 2 Hz.

A first liquid lens cell and a second liquid lens cell may be controlled in tandem to provide stabilization in at least one direction for radiation delivered to an image side space. The power of the first liquid lens cell may be substantially equal and opposite a power of the second liquid lens cell so that focus at an image plane is axially fixed. The power of the first liquid lens cell and a power of the second liquid lens cell may be set to provide focus at an image plane.

In one embodiment, a first pair of liquid lens cells are offset from each in one direction, and a second pair of liquid lens cells offset from each in a direction substantially perpendicular to the first direction. The first pair of liquid lens cells provide image stabilization in the direction of the offset of the first pair, and the second pair of liquid lens cells provide image stabilization in the direction of the offset of the second pair.

A first pair of liquid lens cells may be offset from each other in one direction, and a second pair of liquid lens cells may be offset from each other in a substantially different direction, with the magnitude of the offset of the second pair of liquid lens cells being greater or lesser than the magnitude of the offset of the first pair of liquid lens cells. For example, a stabilization range for the first pair of liquid lens cells may be greater than twice a stabilization range for the second pair of liquid lens cells.

In any of these embodiments, one or more additional liquid lens cells could be used to compensate for thermal effects, adjust the focus of radiation delivered to an image side space or as part of a zoom configuration.

BRIEF DESCRIPTION OF THE DRAWINGS

FIGS. 10A, 10B, 10C and 10D are optical diagrams of the lens system of FIGS. 7A and 7B illustrating different positions of the zoom lens groups and surface shapes between the liquids to stabilize an image.

DETAILED DESCRIPTION

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the invention.

U.S. Provisional Patent Application No. 60/783,338 filed on Oct. 8, 2007 and titled "Liquid Optics Zoom Lens and Imaging Apparatus," herein incorporated by reference in its entirety, discloses a zoom lens system that employs liquid optics to provide zoom and focus functionality. Liquid optics may also be used to provide stabilization. Exemplary embodiments using liquid optics are disclosed herein.

Liquid Optics in a Zoom Lens System

Figure 1:
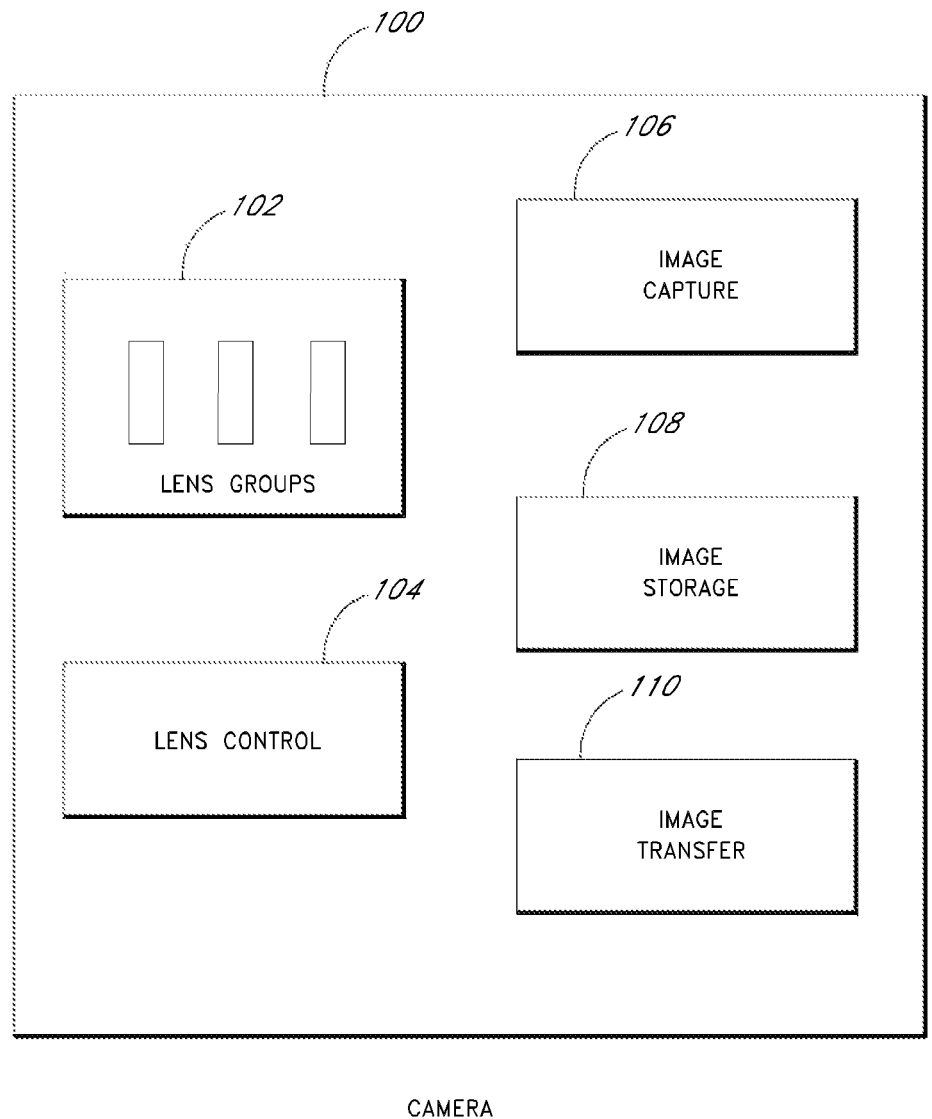
FIG. 1 is a block diagram of a camera.

FIG. 1 illustrates a block diagram of a camera 100 with a zoom lens 102. A zoom lens is an assembly of lens elements with the ability to vary focal length. The individual lens elements may be fixed in place, or slide axially along the body of the lens. A lens group may consist of one or more lens elements. At least one movable lens group provides variation of the magnification of an object. As the at least one lens group moves to accomplish magnification, the position of the focal plane may also move. At least one other movable lens group may move to compensate for the movement of the focal plane to maintain a constant focal plane position. Compensation for the movement of the focal plane may also be achieved mechanically by moving the complete lens assembly as the magnification of the lens changes.

The individual lens elements may be constructed from solid-phase materials, such as glass, plastic, crystalline, or semiconductor materials, or they may be constructed using liquid or gaseous materials such as water or oil. The space between lens elements could contain one or more gases. For example normal air, nitrogen or helium could be used. Alternatively the space between the lens elements could be a vacuum. When "Air" is used in this disclosure, it is to be understood that it is used in a broad sense and may include one or more gases, or a vacuum.

A zoom lens will often have three or more moving lens groups to achieve the zoom and focusing functions. A mechanical cam may link two movable lens groups to perform zooming, and a third movable lens group may be used for focus.

The zoom range is determined in part by the range of movement for the movable lens elements. Greater zoom ranges require additional space for movement of the lens elements. One or more of the movable lens groups may be replaced by a lens group that implements liquid cell technology. Because liquid cells do not require space for axial movement, the length of the lens design which contains the movable lens groups may be reduced. Alternatively, the space that would have been used for axial movement of the movable lens groups can be used to include additional optical elements or folds. Although a liquid cell does not require space for movement, it may be part of a movable lens group.

A liquid cell may be used for both zooming and focusing. In one embodiment, a movable lens group is used with a lens group that implements liquid cell technology. There is no need for a mechanical cam with one movable lens group. Not having a cam allows for additional movements.

One or more movable lens groups are used with one or more liquid cells to achieve zooming and focusing. A single movable lens group and a single liquid cell can perform both zooming, focusing and compensation for thermal effects. In one implementation, a zoom system has at least a first and second lens group. The first lens group is relatively high power, and the second lens group is relatively low power, the lens power being equivalent to the inverse of the focal length of the lens. The first lens group comprises conventional glass or other solid lenses and the second lens group comprises at least one liquid lens.

A liquid cell uses two or more liquids to form a lens. The focal length of the lens is partly determined by the angle of contact between the liquids and the difference in the refractive index of the liquids. The range of power variation is limited by the difference in the refractive index of the liquids employed and the finite range of radius of curvature at the surface interface between the liquids due to space constraints. U.S. Patent Application Publication No. 2006/0126190, herein incorporated by reference, discloses a lens employing the deformation of a drop of liquid through electrowetting. U.S. Pat. No. 6,936,809, herein incorporated by reference, discloses using electrowetting technology to shift laterally an image formed on an image plane.

Presently contemplated liquid lens systems will have a difference in refractive index of at least about 0.2, preferably at least about 0.3, and in some embodiments at least about 0.4. Water has a refractive index of about 1.3, and adding salt may allow varying the refractive index to about 1.48. Suitable optical oils may have a refractive index of at least about 1.5. Even by utilizing liquids with higher, lower or higher and lower refractive indices, for example a higher refractive index oil, the range of power variation remains limited. This limited range of power variation usually provides less magnification change than that of a movable lens group. Therefore, in a simple zoom lens system, to provide zooming while maintaining a constant image plane position most of the magnification change may be provided by one movable lens group and most of the compensation of defocus at the image plane during the magnification change may be provided by one liquid cell. However, it should be noted that more movable lens groups or more liquid cells, or both, may be utilized.

The movable lens group can have a positive or negative power. The liquid cell can have a range of variable power where the power is always positive, always negative or goes from positive to negative, or vice versa. Proper arrangement of the movable lens group and the liquid cell provides an extended zoom ratio of greater than 2× and preferably greater than 3× while offering good image quality throughout the zoom range. The arrangement, in addition to zooming, may also provide focusing at different object distances over an extended focus range by utilizing additional available power variation from the liquid cell, the movable lens group or both. This additional power variation provided by the liquid cell or the movable lens group or both for focusing is readily available. Since one movable lens group does not necessarily require a cam with a fixed locus of movement, the position of the movable zoom lens group can be adjusted for zooming and focusing. High performance imaging is achieved by utilizing both the movable zoom lens group and the liquid cell for zooming and focusing.

It is also possible to replace the movable zoom lens group with at least one liquid cell. This would increase the complexity of the optical system and may cause the optical system to have other disadvantages, such as reduced magnification change.

FIG. 1 also illustrates a lens control module 104 that controls the movement and operation of the lens groups in lens 102. The control module 104 includes electronic circuitry that controls the radius of curvature in the liquid lens cell. Electronic circuitry may also control the position of the movable lens group. The appropriate electronic signal levels for various focus positions and zoom positions can be determined in advance and placed in a lookup table. Alternatively, analog circuitry or a combination of circuitry and a lookup table can generate the appropriate signal levels. In one embodiment, a polynomial is used to determine the appropriate electronic signal levels. Points along the polynomial could be stored in a lookup table or the polynomial could be implemented with circuitry.

Thermal effects may also be considered in the control of the radius of curvature of surface between the liquids or the position of movable lens groups or both. The polynomial or lookup table may include an additional variable related to the thermal effects.

The control module 104 may include preset controls for specific zoom settings or focal lengths. These settings may be stored by the user or camera manufacturer.

FIG. 1 further illustrates an image capture module 106 that receives an optical image corresponding to an external object. The image is transmitted along an optical axis through the lens 102 to the image capture module 106. The image capture module 106 may use a variety of formats, such as film (e.g., film stock or still picture film), or electronic image detection technology (e.g., a CCD array, CMOS device or video pickup circuit). The optical axis may be linear, or it may include folds.

Image storage module 108 maintains the captured image in, for example, on-board memory or on film, tape or disk. In one embodiment, the storage medium is removable (e.g., flash memory, film canister, tape cartridge or disk).

Image transfer module 110 provides transferring of the captured image to other devices. For example, the image transfer module 110 may use one or a variety of connections such as a USB port, IEEE 1394 multimedia connection, Ethernet port, Bluetooth wireless connection, IEEE 802.11 wireless connection, video component connection, or S-Video connection.

The camera 100 may be implemented in a variety of ways, such as a video camera, a cell phone camera, a digital photographic camera, or a film camera.

Figure 2:
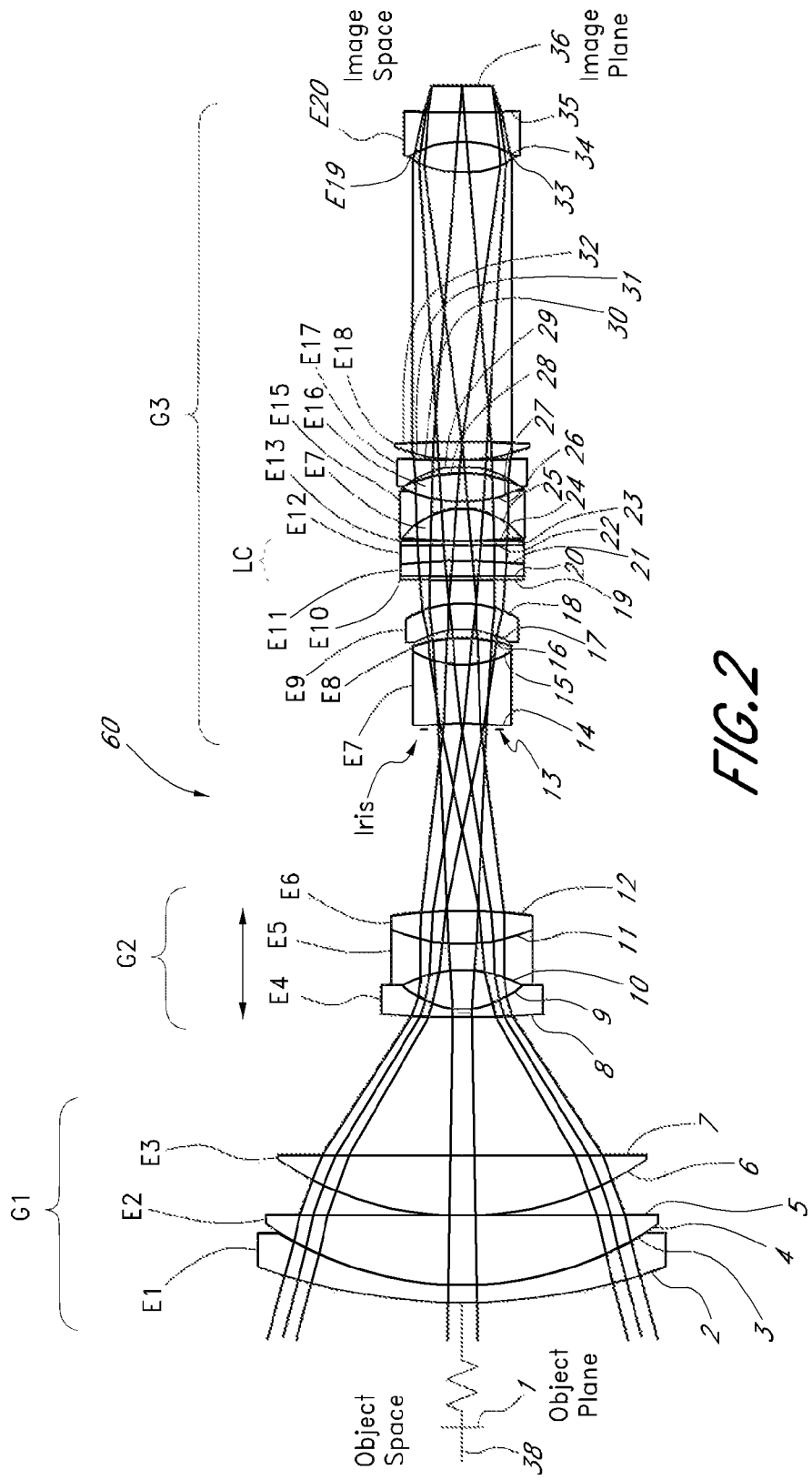
FIG. 2 is an optical diagram of a zoom lens system employing liquids.

An embodiment of a zoom lens will now be described by way of a design example. Referring first to FIG. 2, each lens element is identified by the letter "E" followed by a numeral from 1 through 20 and the general configuration of each lens element is depicted, but the actual radius of each lens surface is set forth below in TABLE 1. The lens, object, stop or iris and image surfaces are identified by a numeral from 1 through 36. The three lens groups are identified in FIG. 2 by the letter "G" followed by a numeral from 1 through 3 and the liquid lens cell is identified by the letters "LC" and comprises optical surfaces 19 through 23. The optical axis is identified in FIG. 2 by a numeral 38.

Each lens element has its opposite surfaces identified by a separate but consecutive surface number as, for example, lens element E1 has lens surfaces 2 and 3, lens element E9 has lens surfaces 17 and 18 and so forth, as shown in FIG. 2. The location of the object to be imaged, particularly as it relates to focus distance, is identified by a vertical line and the numeral 1 on the optical axis 38 and the real image surface is identified by the numeral 36. All of the lens surfaces are spherical or plano except lens surfaces 4 and 8 which are aspheric surfaces that are non-spherical, non-plano but rotationally symmetrical about the optical axis.

Before describing the detailed characteristics of the lens elements, a broad description of the lens groups and their axial positions and movement, and, the liquid lens cell and the variation in surface shape of contacting liquids will be given for the zoom lens system 60.

The positive or negative power of each lens group is defined as the inverse of the focal length. The resultant optical power of each group of lenses is as follows: the objective lens group G1 is positive, the zoom lens group G2 is negative and the rear lens group G3 is positive, from a lower positive value to a higher positive value as the shape of the surface in the liquid cell is varied. The horizontal arrow with arrowheads on both ends in the upper portion of FIG. 2 indicates that the zoom lens group G2 is movable in both axial directions.

While only the lens elements are physically shown in FIG. 2, it is to be understood that mechanical devices and mechanisms are provided for supporting the lens elements and for causing axial movement of the movable zoom lens group in a lens housing or barrel. In addition, it is to be understood that electronic circuitry changes the profile of the variably shaped optical surface in the liquid lens cell.

The lens construction and fabrication data for the above described zoom lens system 60 is set forth below in TABLE 1. The data in TABLE 1 is given at a temperature of 25° C. (77° F.) and standard atmospheric pressure (760 mm Hg). Throughout this specification measurements are in millimeters (mm) with the exception of wavelengths which are in nanometers (nm). In TABLE 1, the first column "Item" identifies each optical element and each location, i.e. object plane, image plane, etc., with the same numeral or label as used in FIG. 2. The second column identifies the "Group" to which that optical element (lens) belongs with the same numerals used in FIG. 2. The third column "Surface" is a list of the surface numbers of the object (line "1" in FIG. 2 and "Object" in TABLE 1), the Stop (iris) 13 and each of the actual surfaces of the lenses, as identified in FIG. 2. The fourth column "Focus Position" identifies three typical focus positions (F1, F2 and F3) for the zoom lens system 60 wherein there are changes in the distance (separation) between some of the surfaces listed in the third column and there are changes in the radius of curvature of the surface 21 listed in the third column, as described below more thoroughly. The fifth column "Separation" is the axial distance between that surface (third column) and the next surface. For example, the distance between surface S2 and surface S3 is 1.725 mm.

The sixth column, headed by the legend "Radius of Curvature," is a list of the optical surface radius of curvature for each surface, with a minus sign (−) meaning the center of the radius of curvature is to the left of the surface, as viewed in FIG. 2 and "Infinity" meaning an optically flat surface. The asterisk (*) for surfaces 4 and 8 indicate these are aspheric surfaces for which the "radius of curvature" is a base radius. Use of aspherical surfaces provides for the correction of aberrations in the zoom lens while enabling a smaller overall size and a simpler configuration. The formula and coefficients for the surface profiles of aspheric surfaces 4 and 8 are governed by the following equation:

$$z = \frac{cy^2}{1+[1-(1+\kappa)c^2y^2]^{1/2}} + Ay^4 + By^6 + Cy^8 + Dy^{10} + Ey^{12} + Fy^{14}$$

where:
$c$=surface curvature ($c=1/r$ where r is the radius of curvature)
$y$=radial aperture height of surface measured from the X and Y axis, where:
$y(X^2+Y^2)^{1/2}$
$\kappa$=conic coefficient
A, B, C, D, E, F=$4^{th}$, $6^{th}$, $8^{th}$, $10^{th}$, $12^{th}$ and $14^{th}$, respectively, order deformation coefficients
$z$=position of a surface profile for a given y value or measured along the optical axis from the pole (i.e., axial vertex) of the surface The coefficients for surface 4 are:
$\kappa=-0.6372$
$A=+0.9038\times10^{-6}$
$B=+0.2657\times10^{-8}$
$C=-0.1105\times10^{-10}$
$D=+0.4301\times10^{-13}$
$E=-0.8236\times10^{-16}$
$F=+0.6368\times10^{-19}$
The coefficients for surface 8 are:
$\kappa=+0.0000$
$A=+0.5886\times10^{-4}$
$B=-0.5899\times10^{-6}$
$C=+0.8635\times10^{-8}$
$D=-0.5189\times10^{-10}$
$E=-0.1186\times10^{-11}$
$F=+0.1631\times10^{-13}$ Columns seven through nine of TABLE 1 relate to the "Material" between that surface (third column) and the next surface to the right in FIG. 2, with the column "Type" indicating whether there is a lens (Glass) or empty space (Air) or liquid lens (Liquid) between those two surfaces. The glass and liquid lenses are identified by optical glass or liquid in the column "Code". For convenience, all of the lens glass has been selected from glass available from Ohara Corporation and the column "Name" lists the Ohara identification for each glass type, but it is to be understood that any equivalent, similar or adequate glass may be used. Also, the lens liquid of oil has been selected from a liquid available from Cargille Laboratories, Inc., and water is commonly available from various sources, but it is to be understood that any equivalent, similar or adequate liquid may be used. The water liquid at surface 20 has the following refractive indices 1.331152, 1.332987, 1.334468 and 1.337129 at respective wavelengths 656.27, 589.29, 546.07 and 486.13 nanometers. The oil liquid at surface 21 has the following refractive indices 1.511501, 1.515000, 1.518002 and 1.523796 at respective wavelengths 656.27, 589.29, 546.07 and 486.13 nanometers.

The last column of TABLE 1 headed "Aperture Diameter" provides the maximum diameter for each surface through which the light rays pass. All of the maximum aperture diameters, except for the Stop surface 13, are given at a wavelength of 546.1 nanometers for a maximum image diameter of about 6 mm and F-numbers of F/2.8 to F/4.0 at the Image Plane, for all Zoom and Focus Positions. The maximum aperture diameter of the Stop surface 13 is given in TABLE 1 at a wavelength of 546.1 nanometers and an F-number of F/2.8 at the Image Plane for Zoom Position Z1 and Focus Position F1. At the Image Plane 36, the Maximum Aperture Diameter is given as an approximate value.

TABLE 1

| | | | | | | Material | | | Aperture |
|---|---|---|---|---|---|---|---|---|---|
| | | | Focus | | Radius of | | | | |
| Item | Group | Surface | Position | Separation | Curvature (mm) | Type | Name | Code | Diameter (mm) |
| Object | | 1 | F1 | Infinity | Infinity | Air | | | |
| | | | F2 | 1016.2500 | | | | | |
| | | | F3 | 378.7500 | | | | | |
| E1 | G1 | 2 | All | 1.7250 | 59.1716 | Glass | SLAM66 | 801350 | 37.161 |
| | | 3 | All | 0.0750 | 34.5954 | Air | | | 35.567 |
| E2 | G1 | 4 | All | 6.7565 | *33.0488 | Glass | SFPL51 | 497816 | 35.618 |
| | | 5 | All | 0.0750 | 2758.9929 | Air | | | 35.182 |
| E3 | G1 | 6 | All | 5.8657 | 32.7151 | Glass | SFPL53 | 439950 | 33.680 |
| | | 7 | F1 | TABLE 2 | −2981.4301 | Air | | | 33.034 |
| | | | F2 | TABLE 2 | | | | | |
| | | | F3 | TABLE 2 | | | | | |
| E4 | G2 | 8 | All | 0.7652 | *461.6464 | Glass | SLAH64 | 788474 | 14.273 |
| | | 9 | All | 3.8333 | 8.3339 | Air | | | 11.605 |
| E5 | G2 | 10 | All | 2.6582 | −12.6370 | Glass | SFPL53 | 439950 | 11.587 |
| E6 | G2 | 11 | All | 3.2165 | 18.1883 | Glass | SLAM66 | 801350 | 12.383 |
| | | 12 | F1 | TABLE 3 | −55.4718 | Air | | | 12.337 |
| | | | F2 | TABLE 3 | | | | | |
| | | | F3 | TABLE 3 | | | | | |
| Stop/Iris | G3 | 13 | All | 0.6371 | Infinity | | | | 6.708 |
| E7 | G3 | 14 | All | 5.7168 | −26.3844 | Glass | SLAH65 | 804466 | 6.757 |

TABLE 1-continued

Optical Prescription

| Item | Group | Surface | Focus Position | Separation | Radius of Curvature (mm) | Material Type | Name | Code | Aperture Diameter (mm) |
|---|---|---|---|---|---|---|---|---|---|
| E8 | G3 | 15 | All | 2.6250 | 9.3177 | Glass | STIH53 | 847238 | 8.304 |
| | | 16 | All | 0.8432 | −16.3366 | Air | | | 8.533 |
| E9 | G3 | 17 | All | 2.5647 | −9.2859 | Glass | SLAH58 | 883408 | 8.508 |
| | | 18 | All | 2.2767 | −11.1961 | Air | | | 9.665 |
| E10 | G3 | 19 | All | 0.4500 | Infinity | Glass | SBSL7 | 516641 | 10.151 |
| E11 | G3 | 20 | All | 1.5000 | Infinity | Liquid | WATER | | 10.201 |
| E12 | G3 | 21 | F1 | 1.5000 | TABLE 4 | Liquid | OIL | T30004091-AB | 10.367 |
| | | | F2 | | TABLE 4 | | | | |
| | | | F3 | | TABLE 4 | | | | |
| E13 | G3 | 22 | All | 0.4500 | Infinity | Glass | SBSL7 | 516641 | 10.584 |
| | | 23 | All | 0.0750 | Infinity | Air | | | 10.642 |
| E14 | G3 | 24 | All | 3.1583 | 120.2680 | Glass | SLAH65 | 804466 | 10.680 |
| E15 | G3 | 25 | All | 0.6000 | −7.2241 | Glass | STIH10 | 728285 | 10.724 |
| | | 26 | All | 0.0750 | 13.8153 | Air | | | 10.634 |
| E16 | G3 | 27 | All | 3.0844 | 13.7118 | Glass | SBSM10 | 623570 | 10.696 |
| | | 28 | All | 0.3424 | −11.1618 | Air | | | 10.713 |
| E17 | G3 | 29 | All | 0.6000 | −9.5071 | Glass | STIH13 | 741278 | 10.652 |
| | | 30 | All | 0.0750 | 68.8748 | Air | | | 11.180 |
| E18 | G3 | 31 | All | 1.7063 | 18.2078 | Glass | SLAL13 | 694532 | 11.589 |
| | | 32 | All | 26.6908 | −115.6915 | Air | | | 11.592 |
| E19 | G3 | 33 | All | 3.1085 | 10.2784 | Glass | SNPH1 | 808228 | 9.888 |
| E20 | G3 | 34 | All | 2.7193 | −9.9003 | Glass | SLAH58 | 883408 | 9.581 |
| | | 35 | All | 2.6192 | 58.0014 | Air | | | 7.805 |
| Image | | 36 | All | 0.0000 | Infinity | Air | | | 6.008 |

Zoom lens system 60 is provided with an optical stop at the surface 13 which controls the diameter of the aperture through which light rays may pass at that point. The optical stop is the location at which a physical iris (or diaphragm) is located. The iris is located before the rear lens group G3 and is axially stationary with that lens group. Note that in FIG. 4A, the rim rays pass through the axis side of the tic marks of the optical stop surface 13 such that the zoom lens system has no vignetting of light beams at any field position, zoom position and focus position. However, note that the F-number varies through zoom and focus positions and the iris opens or closes accordingly. The diameter of the iris at zoom positions Z1-Z8 for focus position F1 is 6.71, 6.39, 5.96, 5.53, 5.18, 4.84, 4.63 and 4.61. This shows that the iris located at 13 should close as the focal length increases. As compared to focus position F1, the diameter of the iris at zoom positions Z1-Z8 for focus positions F2 and F3 changes by a small amount of less than 0.3 mm diameter to maintain the same F-numbers as for focus position F1.

Referring to TABLE 1, for illustrating the scope and versatility of the design there are eight different Zoom Positions Z1, Z2, Z3, Z4, Z5, Z6, Z7 and Z8 and three different Focus Positions F1, F2 and F3 set forth in the data which, in effect, provides specific data for twenty four (8×3=24) different combinations of positions for the movable zoom lens group G2 and the variable shape optical surface 21.

The focal lengths of zoom lens system 60 for zoom positions Z1-Z8 at focus position F1, at a wavelength of 546.1 nanometers are; 5.89, 7.50, 11.25, 15.00, 18.75, 30.00, 41.25 and 45.00 mm, respectively. The corresponding F-numbers for the focal lengths for data positions Z1-Z8, at a wavelength of 546.1 nanometers are; 2.80, 2.90, 3.05, 3.25, 3.45, 3.70, 3.95 and 4.00, respectively.

For Focus Position F1 the Object Plane 1 is assumed to be at infinity, for F2 the Object Plane 1 is at an intermediate distance of about 1016.25 mm, and for F3 the Object Plane 1 is at a close distance of about 378.75 mm (i.e., 378.75 mm away from the image plane). At each of these three Focus Positions F1, F2 and F3, the lens groups G1 and G3 remain in the same position throughout the full range of movement of the zoom lens group G2. TABLES 2 and 3 provide separation values of surfaces 7 and 12 and TABLE 4 provides the radii of curvature of surface 21 for zoom positions Z1-Z8 and F1-F3.

TABLE 2

Separation Values for Surface 7

| Surface | Focus | Z1 | Z2 | Z3 | Z4 | Z5 | Z6 | Z7 | Z8 |
|---|---|---|---|---|---|---|---|---|---|
| 7 | F1 | 0.0832 | 5.7132 | 13.7126 | 18.4633 | 21.6974 | 27.4007 | 30.5400 | 31.3096 |
| 7 | F2 | 0.0902 | 5.7486 | 13.6468 | 18.3289 | 21.5154 | 27.0776 | 30.0174 | 30.7361 |
| 7 | F3 | 0.0750 | 5.6942 | 13.4674 | 18.1217 | 21.3355 | 26.7467 | 29.5798 | 30.2701 |

TABLE 3

| | | Separation Values for Surface 12 | | | | | | | |
|---|---|---|---|---|---|---|---|---|---|
| Surface | Focus | Z1 | Z2 | Z3 | Z4 | Z5 | Z6 | Z7 | Z8 |
| 12 | F1 | 31.5294 | 25.8992 | 17.8996 | 13.1486 | 9.9140 | 4.2101 | 1.0701 | 0.3000 |
| 12 | F2 | 31.5178 | 25.8581 | 17.9590 | 13.2762 | 10.0892 | 4.5268 | 1.5870 | 0.8729 |
| 12 | F3 | 31.5324 | 25.9120 | 18.1380 | 13.4831 | 10.2689 | 4.8577 | 2.0248 | 1.3384 |

TABLE 4

| | | Radii of Curvature for Surface 21 | | | | | | | |
|---|---|---|---|---|---|---|---|---|---|
| Surface | Focus | Z1 | Z2 | Z3 | Z4 | Z5 | Z6 | Z7 | Z8 |
| 21 | F1 | −33.9902 | −40.9700 | −60.9667 | −84.8892 | −106.7630 | −101.7297 | −58.3998 | −48.6792 |
| 21 | F2 | −34.3890 | −42.0587 | −65.5384 | −101.1799 | −154.9184 | −370.2777 | −263.5374 | −212.3139 |
| 21 | F3 | −35.0134 | −43.6001 | −72.6330 | −133.7178 | −351.2333 | 214.4454 | 125.5481 | 115.8049 |

It will be understood that continuous focusing is available between the extreme Focus Positions F1 and F3, that continuous zooming is available between the extreme Zoom Positions Z1 and Z8, and that any combination of continuous focusing and zooming is available within the described focus and zoom ranges with the lens system 60.

Figure 3B:
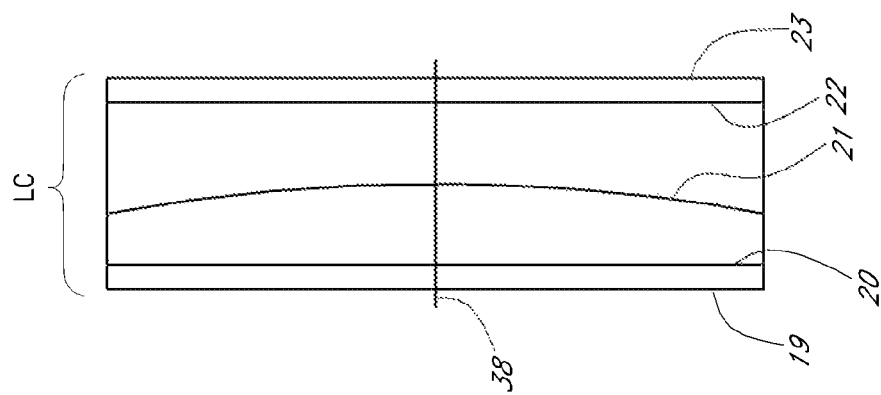
FIGS. 3A and 3B are optical diagrams of the liquid cell of the zoom lens system of FIG. 2 showing the surface shape between the liquids.
Figure 3A:
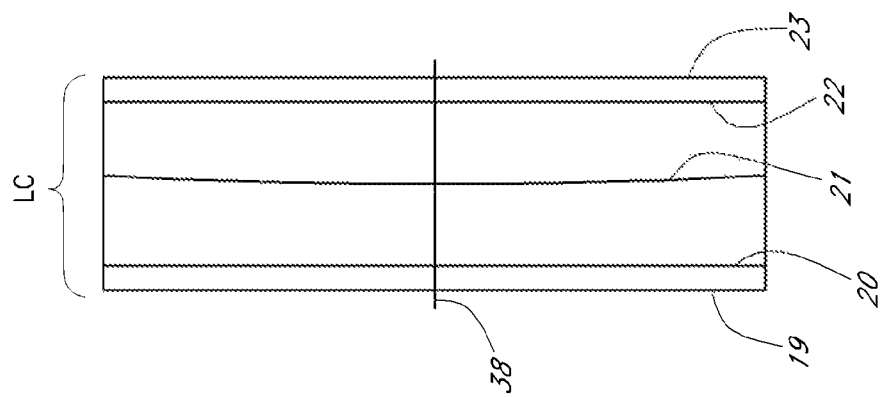

The zoom lens system 60 shown in FIG. 2 and prescribed in TABLE 1 has focal lengths for lens groups G1 and G2 of 54.30 and −12.25 mm respectively. Also, lens group G3, due to the variable shape of the optical surface 21 between the liquids, has a variable focal length which has a minimum value of +30.18 mm and a maximum value of +38.97 mm at zoom position Z1 and focus position F1, and, zoom position Z8 and focus position F3 respectively. The liquid cell LC of zoom lens system 60 is shown in FIGS. 3A and 3B, demonstrating the two extreme radii of curvature from TABLE 1 of the variable shape optical surface 21 between the liquids. In FIGS. 3A and 3B the two radii of curvature of surface 21 are about −33.99 and +115.80 mm respectively. The two extreme focal lengths of the liquid cell LC, in FIGS. 3A and 3B, are −185.20 and 630.97 mm respectively. This difference happens at zoom position Z1 and focus position F1, and, zoom position Z8 and focus position F3. In this embodiment the volume of the two liquids between surfaces 20, 21 and 21, 22 varies as the shape of the variable surface changes. However, it is also possible to maintain a constant volume for each liquid by applying small, equal but opposite, changes to the axial separation between surfaces 20, 21 and 21, 22.

Figure 4A:
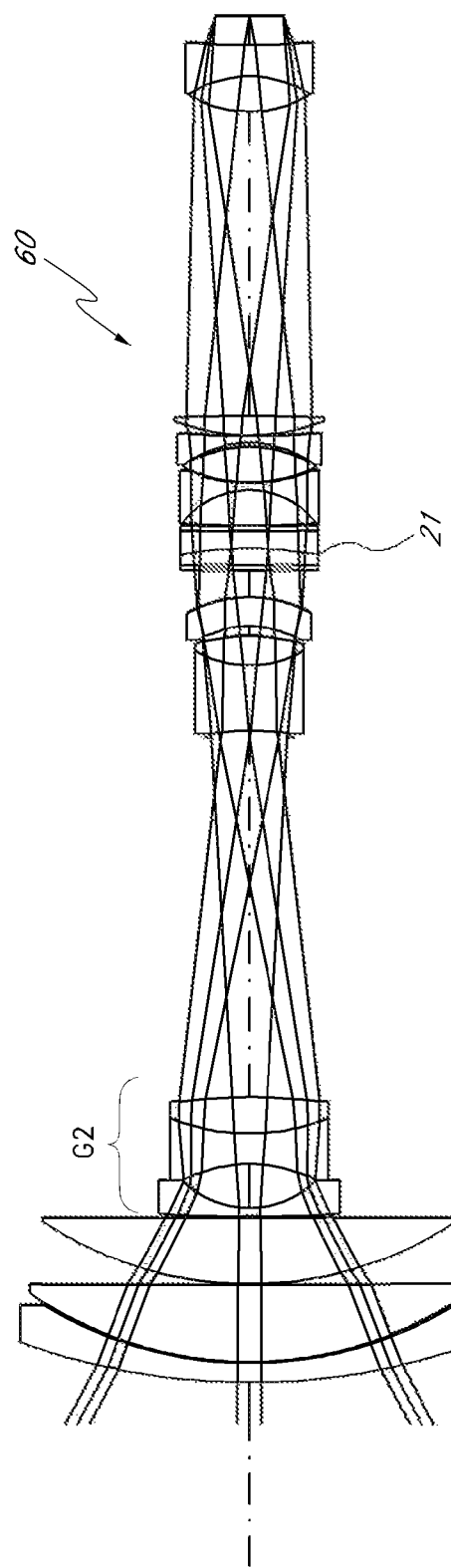
FIGS. 4A, 4B and 4C are optical diagrams of the zoom lens system of FIG. 2 illustrating different positions of the zoom lens groups and surface shapes between the liquids to produce different focal lengths and focus distances.
Figure 4B:
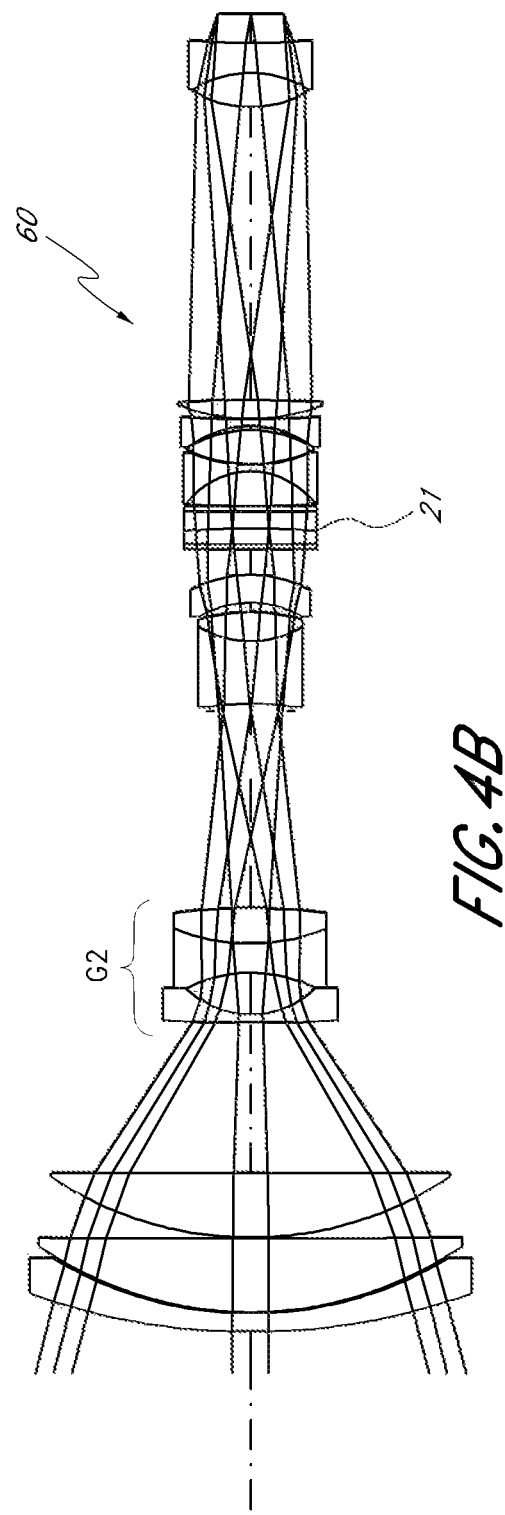
Figure 4C:
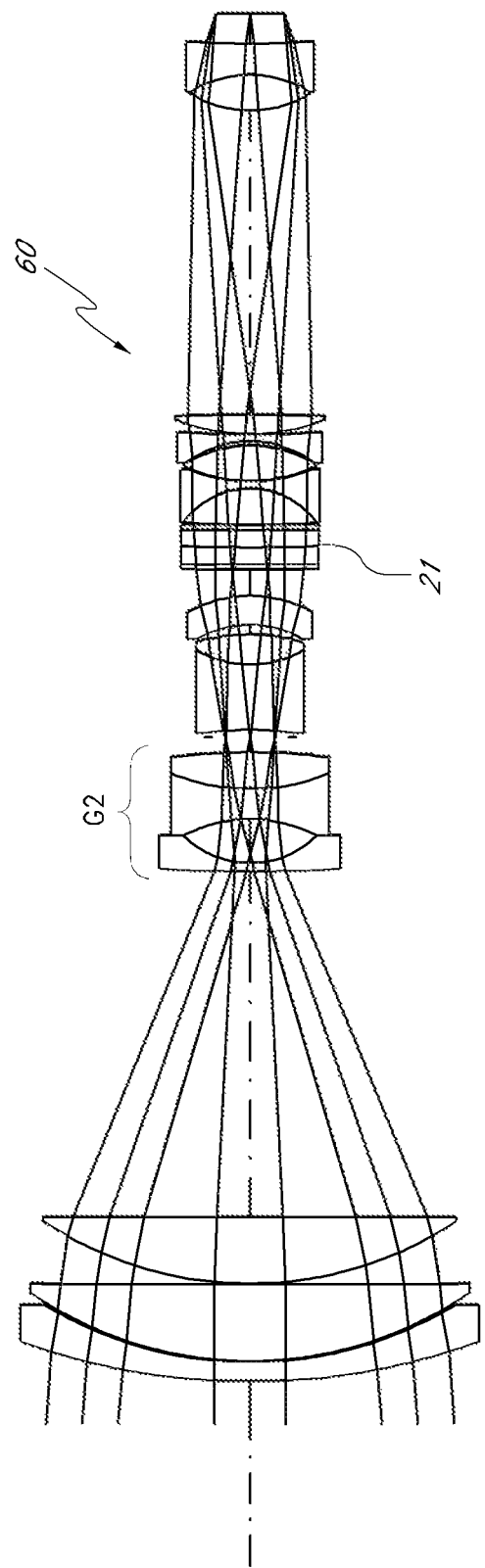

Referring now to FIGS. 4A, 4B, and 4C, the zoom lens system 60 is shown with the zoom lens group in various positions, the shape of the variable surface in the liquid cell in various positions and with light ray traces for those positions. FIG. 4A represents the focus position F1 and zoom position Z1 for which data is set forth above in TABLE 1 with infinity focus and a small focal length of about 5.9 mm. FIG. 4B represents the focus position F2 and zoom position Z3 from TABLE 1 with an intermediate focus and a focal length of about 11.3 mm. FIG. 4C represents the focus position F3 and zoom position Z8 from TABLE 1 with close focus and a focal length of about 44.8 mm.

FIGS. 4A, 4B and 4C show three axial locations of the zoom lens group G2 with corresponding three surface shapes for the variable optical surface 21 for the respective zoom and focus positions; Z1, F1 and Z3, F2 and Z8, F3.

Figure 5A:
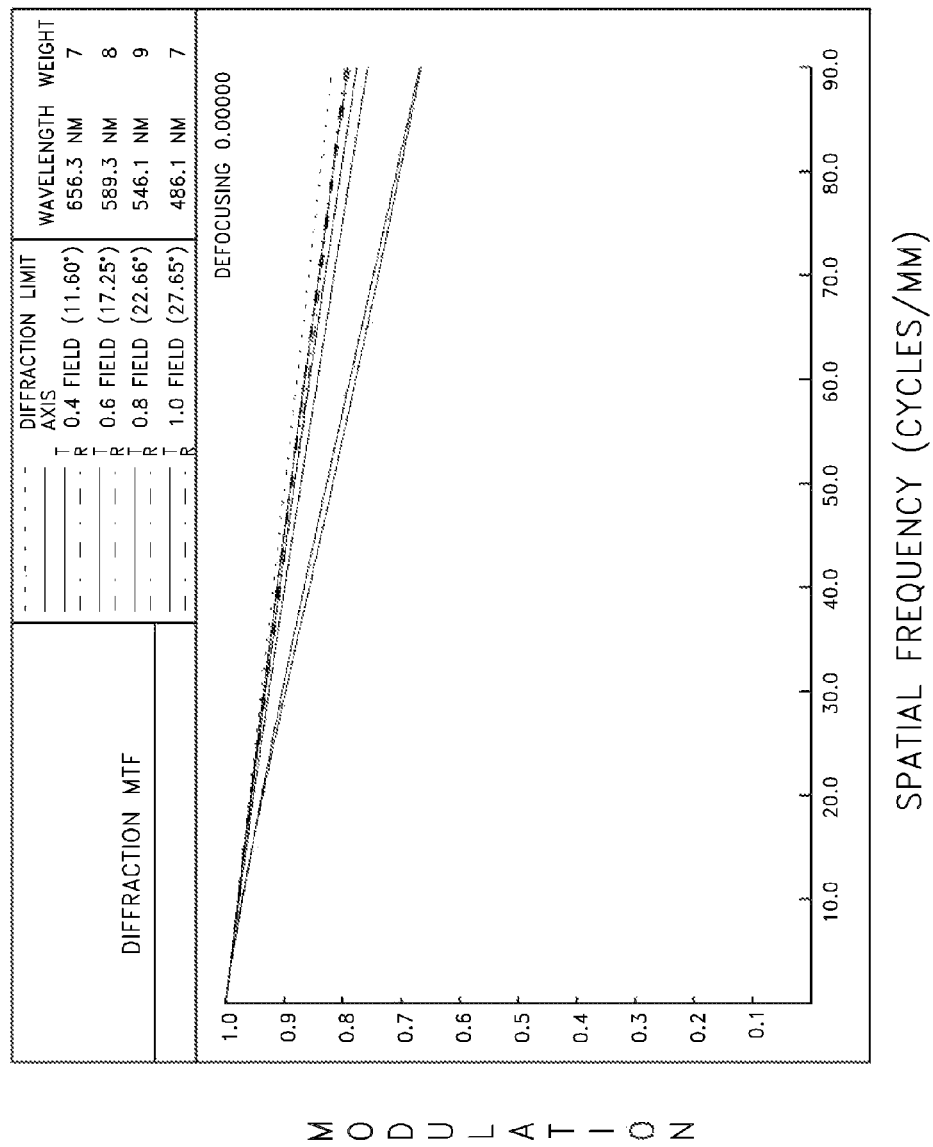
FIGS. 5A, 5B and 5C are modulation transfer function performance diagrams of the zoom lens system of FIGS. 4A, 4B and 4C.
Figure 5B:
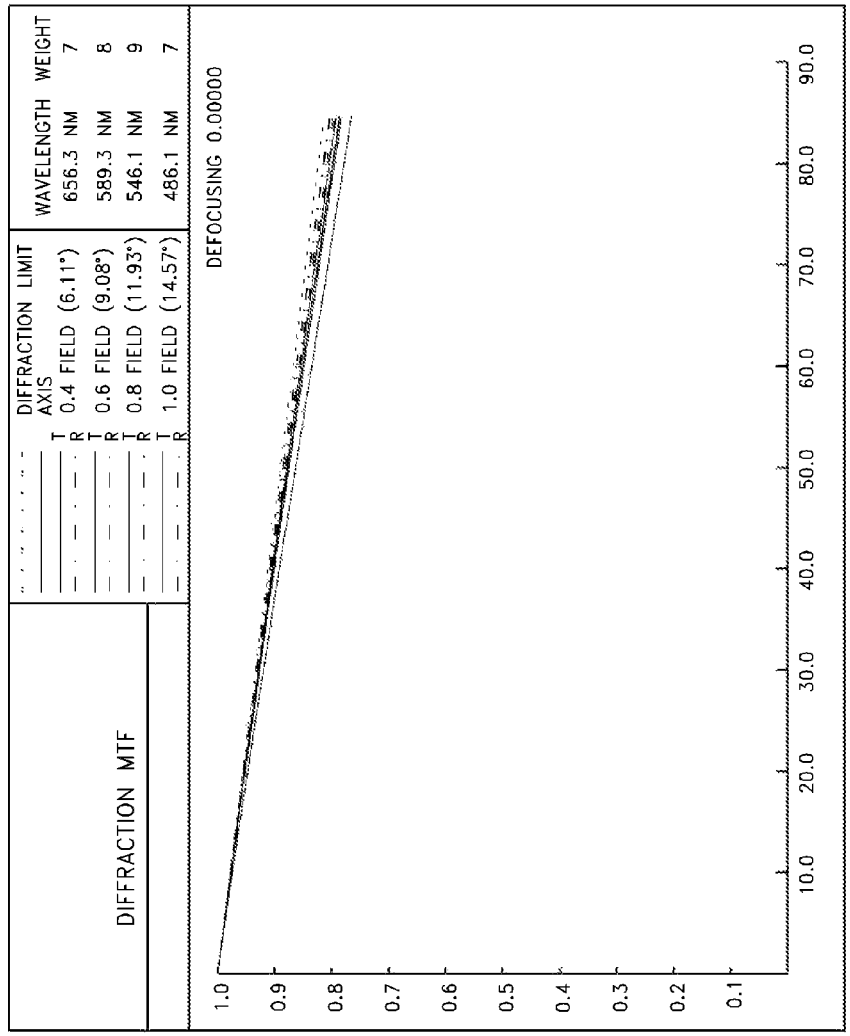
Figure 5C:
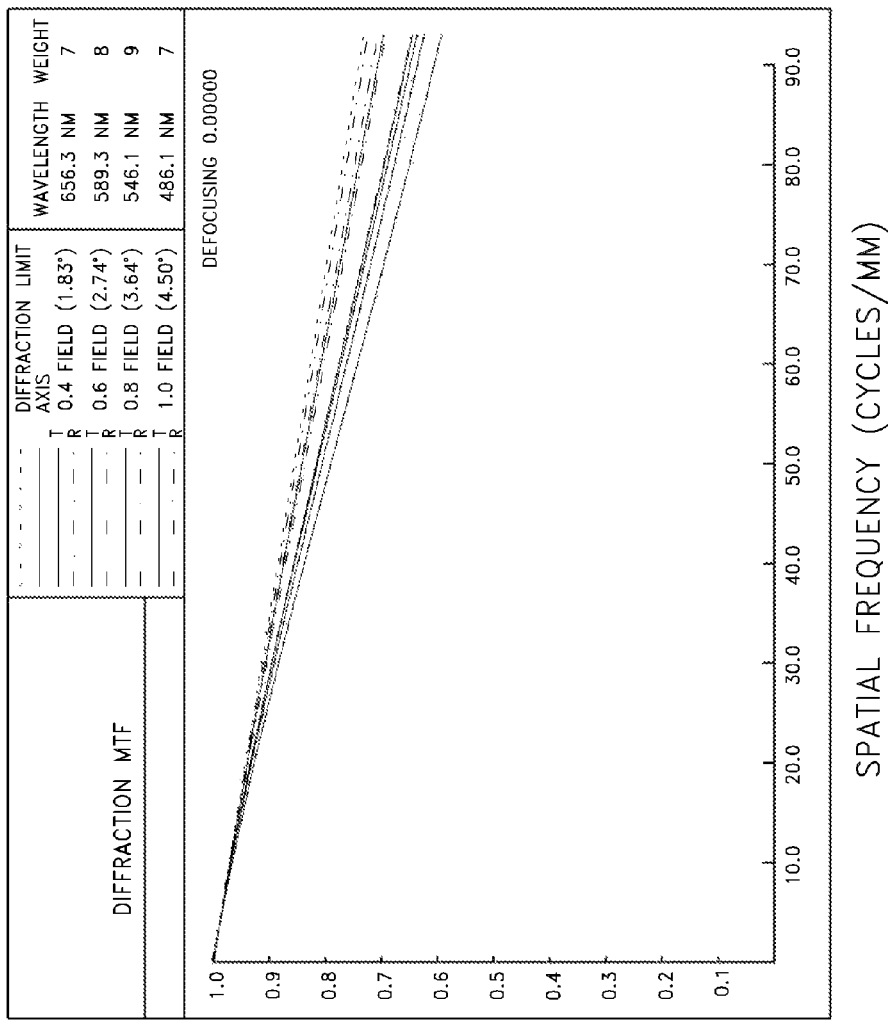

The optical performance of zoom lens system 60 is given in FIGS. 5A, 5B and 5C wherein the diffraction based polychromatic modulation transfer function ("MTF") data (modulation versus spatial frequency) is shown in percent (%) for five different Field Positions in three different combinations of the zoom and focus positions set forth in TABLE 1, namely (Z1, F1), (Z3, F2) and (Z8, F3) which are representative examples. The Field Positions are set forth in two values, both the normalized image height (mm) and the actual object space angle (degree) from the optical axis. The MTF percentages are at the wavelengths and weightings set forth in the top right-hand corner of FIGS. 5A, 5B and 5C and are graphically shown for tangential (T) and radial (R) directions of measurement at the image plane 36. Note that the tangential and radial values are equal at the axial field position (AXIS) and are depicted with only one plot. The maximum spatial frequency shown is 90 cycles/mm which given the image diameter of about 6 mm and choice of detector pixel size may provide high quality images at least up to high definition television (HDTV) resolution, namely 1920 pixels horizontally by 1080 pixels vertically. MTF at a spatial frequency is a relatively standard measurement of optical performance, wherein the value "90 cycles/mm" means 90 pairs of black and white lines per millimeter on a chart from which the clarity is determined. The highest MTF value is about 89% at the full radial field for zoom position Z1 and focus position F2. The lowest MTF value is about 58% at the full tangential field for zoom position Z8 and focus position F3. The minimum relative illumination is about 75% at zoom position Z1 and focus position F1. In general, higher relative illumination values are better, because a low number means that light is falling off in the corners of the picture. High full field relative illumination is preferred for state of the art detectors, which have a constant response to light in all areas and will faithfully reproduce shading in the corners of the image along with changes to the image during zooming. Illumination less than 50% may result in shading in an electronic detector, but will likely be acceptable for film. The highest positive distortion is +3.04% at zoom position Z3 and focus position F1 and the lowest negative distortion is −2.98% at zoom position Z1 and focus position F3. The so-called "breathing" problem of lenses in general (but which may be more prevalent in zoom lenses) wherein the image changes size from far to close focus is virtually absent in zoom lens system 60 at the short focal length of the zoom range where it is most noticeable due to the large depth of field. The lowest breathing is −0.2% at zoom position Z1 and focus position F3 and the highest breathing is −19.5% at zoom position Z8 and focus position F3. Breathing is the percentage change in maximum field angle from infinity focus to a selected focus. Accordingly, at infinity focus (F1), breathing is zero because that is the reference field of view.

All of the performance data is given at a temperature of 25° C. (77° F.), standard atmospheric pressure (760 mm Hg), and at the full apertures available in the zoom lens system 60. However, the zoom lens system 60 does provide substantially constant performance, as for example the MTF values, over a temperature range of 0° to 40° C. (32° to 104° F.) and, if a small degradation in performance (MTF) is acceptable, the operable temperature range can be extended to −10° to 50° C. (14° to 122° F.) or more. For a change in temperature the optimum performance may be achieved by further axial adjustment of the zoom lens group G2 or further change of shape of the contacting optical surface 21 or a combination of both together. This may happen at all zoom and focus positions. At low temperatures of about 0° C. (32° F.) or below, to avoid freezing (forming a solid), the liquids may need to be heated or be replaced with doped liquids in a similar way to anti-freeze being added to water in a car radiator for low temperature operation. However, note that these material temperature changes preferably should not significantly change the optical characteristics of the liquids.

While the described embodiment using zoom lens system 60 is of the appropriate dimensions for use with a 6 mm diameter (so called third inch chip sensor), the dimensions of this zoom lens system may be appropriately scaled up or down for use with various film and electronic detector image formats.

Among the many advantages of the zoom lens system 60 is that of providing zooming over a wide range of focal lengths utilizing only one axially moving zoom lens group. The design of the zoom lens system 60 creates a high performance and mechanically less complex lens system than most conventional high performance zoom lens systems which require at least two axially movable zoom lens groups and corresponding mechanics. The unique lens design of the zoom lens system 60 provides focusing over a large region of focus distance without additional movable lens groups and corresponding mechanics. The disclosed design of zoom lens system 60 is exemplary, and other designs will fall within the scope of the invention. Other features and advantages of the zoom lens system 60 will appear to those skilled in the art from the foregoing description and the accompanying drawings.

Liquid Optics in a Lens System Employing Image Stabilization

Figure 6A:
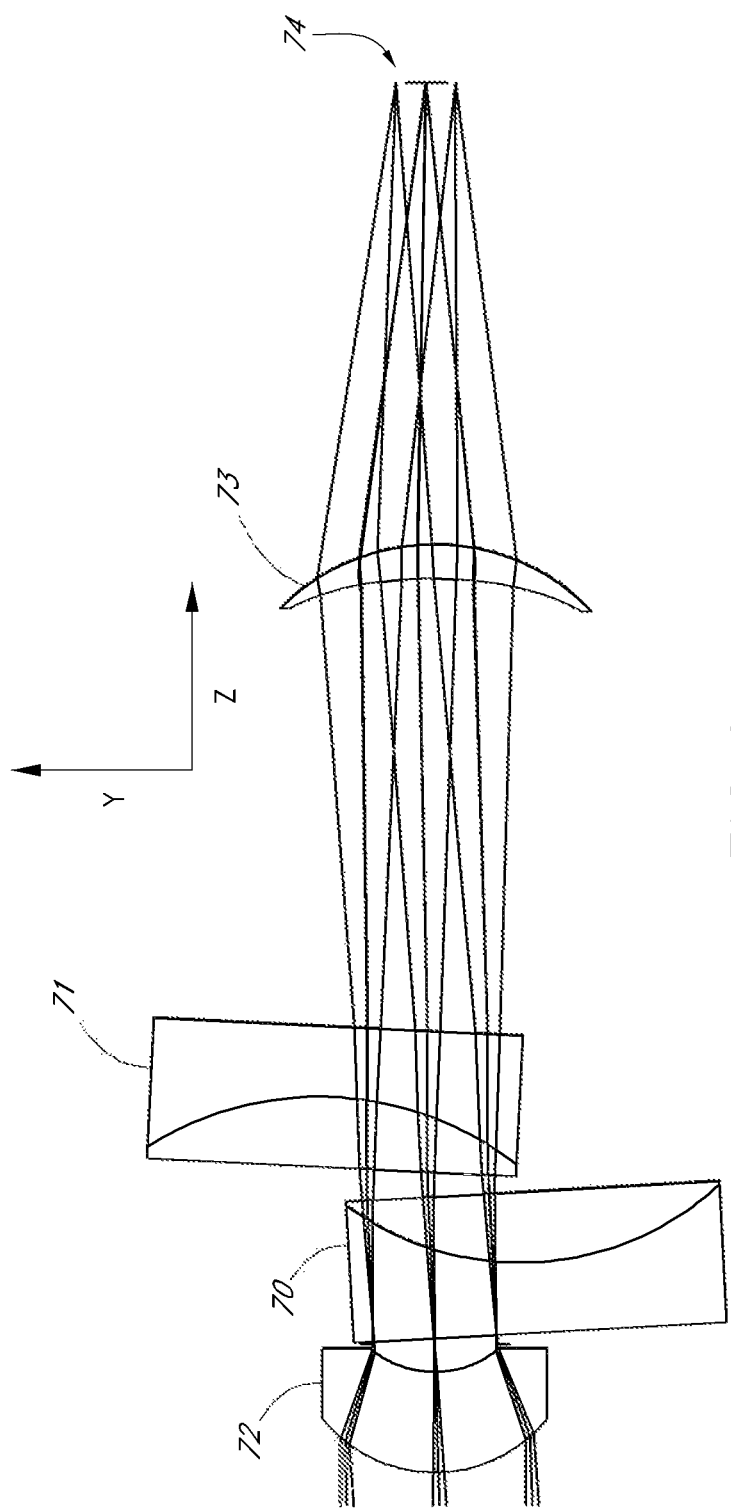
FIGS. 6A and 6B are optical diagrams of a lens system employing liquids to stabilize an image in one direction.
Figure 6B:
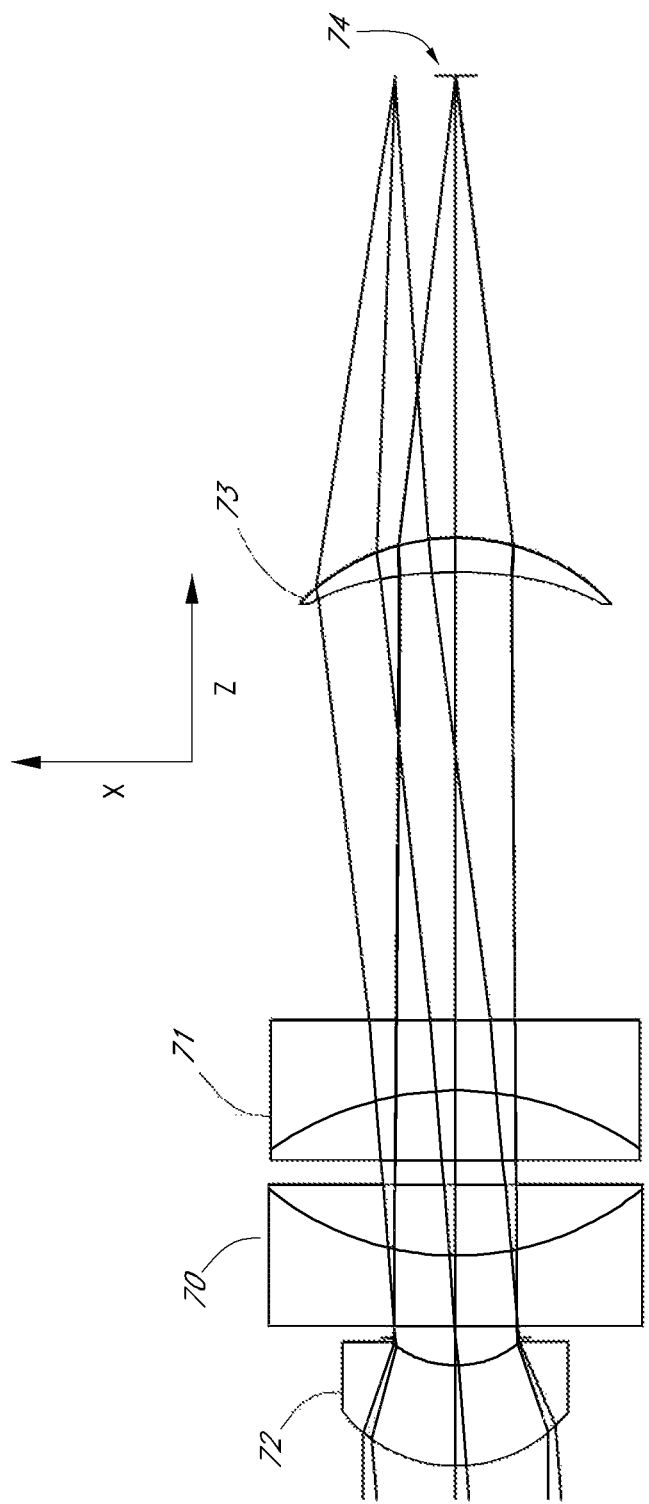

FIGS. 6A and 6B show an optical diagram of a lens system employing liquids to stabilize an image. FIG. 6A shows the lens system in the YZ plane, where the liquid lens cells 70 and 71 are off-axis, decentered, and slightly tilted along the Y axis. FIG. 6B shows the lens system in the XZ plane, where the liquid lens cells 70 and 71 are centered along the X axis. In this simplified lens system, light passes from the object space through a lens element 72. On the other side of the iris, the light passes through liquid lens cells 70 and 71. Lens element 73 converges the light onto image plane 74.

The optical diagram in FIG. 6A illustrates the effects of tilting, or rotating, the lens in the YZ plane. As illustrated, tilting in the YZ plane causes an image at the image plane 74 to shift up or down. The liquid lens cells 70 and 71 are positioned so that they can be controlled in tandem to compensate for the effects of tilting the lens in the YZ plane.

Figure 7A:
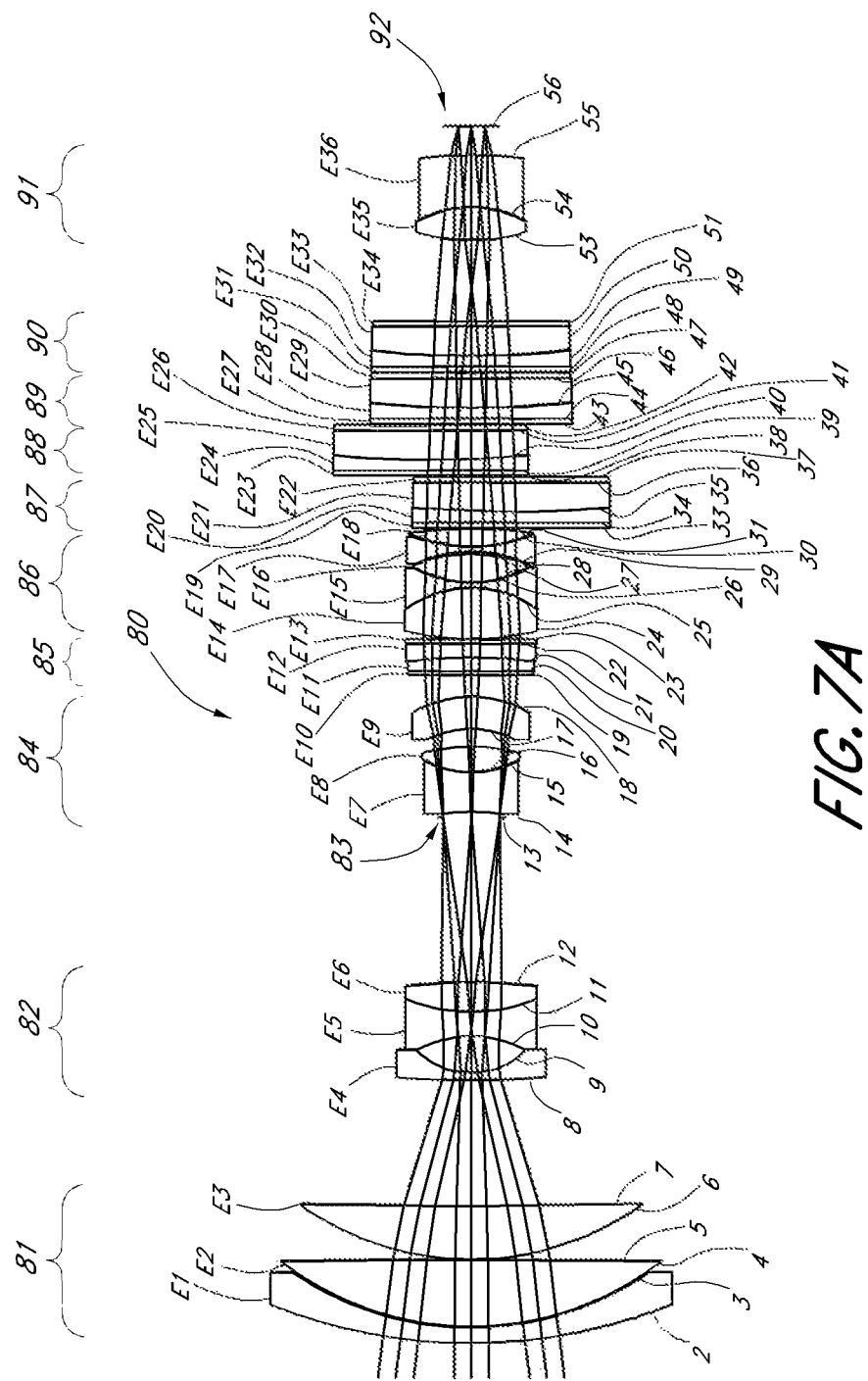
FIGS. 7A and 7B are optical diagrams of a lens system employing liquids to stabilize an image in any direction.
Figure 7B:
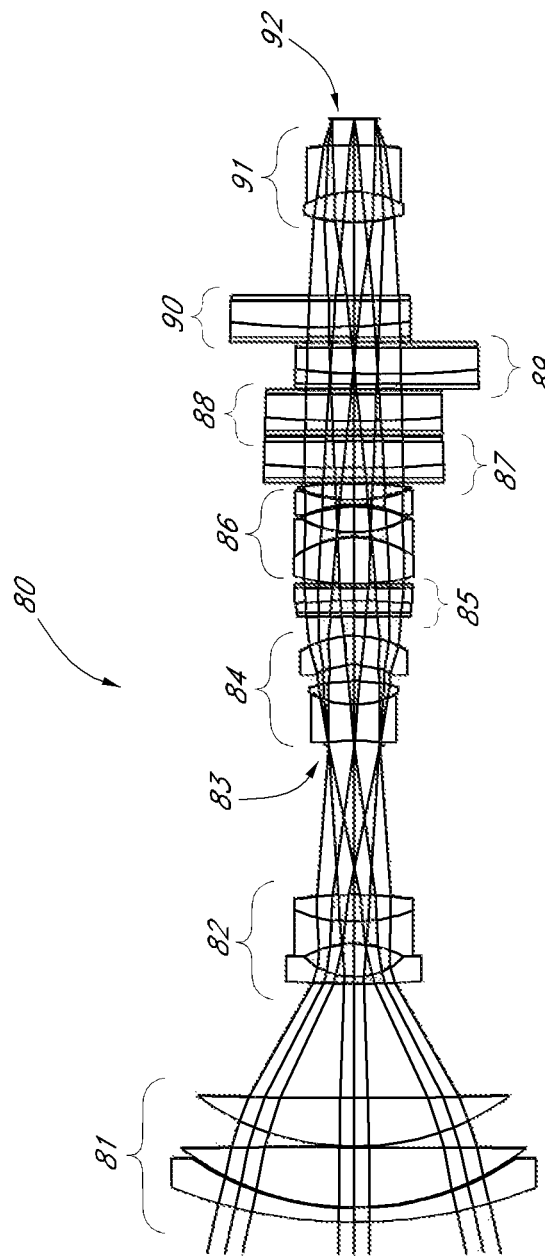

FIGS. 7A and 7B show an optical diagram of a lens system 80 employing four liquid lens cells to stabilize an image. The lens system 80 may be used with a camera 100. FIG. 7A shows the lens system 80 in the YZ plane, and FIG. 7B shows the lens system 80 in the XZ plane. The lens system 80 comprises a first stationary objective lens group 81, a second moving lens group 82, iris 83, a third stationary lens group 84, a first liquid lens cell 85, a fourth stationary lens group 86, second to fifth liquid lens cells 87, 88, 89, 90 and a fifth stationary lens group 91. The image is formed on image plane 92. Liquid lens cells 87 and 88 are offset in opposite directions along the y-axis, and liquid lens cells 89 and 90 are offset in opposite directions along the x-axis. Accordingly, control of the variable surface shapes of liquid lens cells 87 and 88 provides stabilization at the image plane 92 of the image along the y-axis, and control of the variable surface shapes of liquid lens cells 89 and 90 provides stabilization at the image plane 92 of the image along the x-axis.

The configuration illustrated in FIGS. 7A and 7B, shows the liquid lens cells as aligned along the z-axis. Alternatively, the liquid lens cells could be tilted about the z-axis in addition to being offset along the x-axis or y-axis, or the liquid lens cells could be tilted about the z-axis without being offset along the x-axis and the y-axis. Offsetting the liquid lens cells along the x-axis or y-axis or both increases the physical diameter of the lens cells in system 80. Tilting the liquid lens cells may allow reduction or elimination of the offsets in the x and y directions which may reduce the physical diameter of the liquid lens cells, and may allow for a better image stabilization.

The optical power and focal lengths of each group of lenses which do not contain liquid lens cells in FIGS. 7A and 7B is as follows: the objective lens group 81 is positive and +54.700 mm, the moving lens group 82 is negative and −12.165 mm, the lens group 84 is positive and +70.285 mm, the lens group 86 is positive and +42.266 mm and the rear lens group 91 is positive and +19.147 mm.

TABLE 5 sets forth the general configuration of the lens elements illustrated in FIGS. 7A and 7B. The data in TABLE 5 is given at a temperature of 25° C. (77° F.) and standard atmospheric pressure (760 mm Hg). The focal length range is approximately 6 mm to 45 mm. The field of view range is approximately 56.7° to 7.7° (including distortion at infinity focus position F1). The zoom ratio is approximately 7.5× (7.5:1). The image size is approximately Ø6 mm using a 16:9 format. The focus range is approximately infinity (focus position F1) to 378.25 mm (focus position F3) as measured from an object to the vertex of the nearest powered lens surface. The waveband range is approximately 486 nm to 656 nm. The lens system 80 provides image stabilization in the range of approximately ±¼ picture half height and ±⅛ picture half width from at least about a focal length from 15 mm to 45 mm.

TABLE 5

| | | | | | Radius of | | | | Aperture |
|---|---|---|---|---|---|---|---|---|---|
| | | | Focus | Separation | Curvature | | Material | | Diameter/2 |
| Group | Item | Surface | Position | (mm) | (mm) | Type | Name | Code | (mm) |
| | | 1 | F1 | Infinity | Infinity | Air | | | |
| | | | F2 | 1016.2500 | | | | | |
| | | | F3 | 378.7500 | | | | | |
| 81 | E1 | 2 | All | 1.7250 | 59.1203 | Glass | SLAM66 | 801350 | 20.488 |
| 81 | | 3 | All | 0.0750 | 34.4944 | Air | | | 19.360 |
| 81 | E2 | 4 | All | 7.2445 | *32.9559 | Glass | SFPL51 | 497816 | 19.362 |
| 81 | | 5 | All | 0.0750 | −1679.0367 | Air | | | 19.149 |
| 81 | E3 | 6 | All | 5.8060 | 32.1676 | Glass | SFPL53 | 439950 | 17.393 |
| 81 | | 7 | F1 | TABLE 6 | 603.6202 | Air | | | 17.043 |
| | | | F2 | TABLE 6 | | | | | |
| | | | F3 | TABLE 6 | | | | | |
| 82 | E4 | 8 | All | 0.7652 | *421.5729 | Glass | SLAH64 | 788474 | 7.306 |
| 82 | | 9 | All | 4.0061 | 8.3253 | Air | | | 5.910 |
| 82 | E5 | 10 | All | 2.6582 | −12.7245 | Glass | SFPL53 | 439950 | 5.900 |
| 82 | E6 | 11 | All | 3.2165 | 18.4437 | Glass | SLAM66 | 801350 | 6.360 |
| 82 | | 12 | F1 | TABLE 7 | −56.6544 | Air | | | 6.350 |
| | | | F2 | TABLE 7 | | | | | |
| | | | F3 | TABLE 7 | | | | | |
| 83 | Iris/Stop | 13 | All | 0.6371 | Infinity | Air | | | TABLE 8 |
| 84 | E7 | 14 | | 4.3421 | −26.4053 | Glass | SLAH65 | 804466 | 3.531 |
| 84 | E8 | 15 | | 2.7592 | 10.8849 | Glass | STIH53 | 847238 | 4.471 |
| 84 | | 16 | | 1.9504 | −19.6033 | Air | | | 4.660 |
| 84 | E9 | 17 | | 3.4944 | −10.0360 | Glass | SLAH58 | 883408 | 4.759 |
| 84 | | 18 | | 2.2880 | −12.3751 | Air | | | 5.698 |
| 85 | E10 | 19 | | 0.4500 | Infinity | Glass | SBSL7 | 516641 | 6.036 |
| 85 | E11 | 20 | | 1.5000 | Infinity | Liquid | WATER | | 6.064 |
| 85 | E12 | 21 | F1 | 1.5000 | TABLE 9 | Liquid | OIL | T30004091-AB | 6.131 |
| | | | F2 | | TABLE 9 | | | | |
| | | | F3 | | TABLE 9 | | | | |
| 85 | E13 | 22 | | 0.4500 | Infinity | Glass | SBSL7 | 516641 | 6.305 |
| 85 | | 23 | | 0.0750 | Infinity | Air | | | 6.343 |
| 86 | E14 | 24 | | 5.5805 | 30.2458 | Glass | SLAH65 | 804466 | 6.443 |
| 86 | E15 | 25 | | 0.5250 | −12.3375 | Glass | STIH10 | 728285 | 6.358 |
| 86 | | 26 | | 0.0864 | 12.5297 | Air | | | 6.147 |
| 86 | E16 | 27 | | 3.0569 | 12.7154 | Glass | SBSM10 | 623570 | 6.175 |
| 86 | | 28 | | 0.2334 | −17.0356 | Air | | | 6.170 |
| 86 | E17 | 29 | | 0.5250 | −15.0264 | Glass | STIH13 | 741278 | 6.148 |
| 86 | | 30 | | 0.0750 | 17.7536 | Air | | | 6.261 |
| 86 | E18 | 31 | | 1.9042 | 17.3661 | Glass | SLAL13 | 694532 | 6.310 |
| 86 | | 32 | | 0.0750 | −48.1100 | Air | | | 6.323 |
| 87 | E19 | 33 | | 0.6000 | Infinity | Glass | SBSL7 | 516641 | 9.837 |
| 87 | E20 | 34 | | 1.2011 | Infinity | Liquid | WATER | | 9.823 |
| 87 | E21 | 35 | F1 | 3.1684 | TABLE 10 | Liquid | OIL | T30004091-AB | 9.777 |
| | | | F2 | | TABLE 10 | | | | |
| | | | F3 | | TABLE 10 | | | | |
| 87 | E22 | 36 | | 0.6000 | Infinity | Glass | SBSL7 | 516641 | 9.683 |
| 87 | | 37 | | 0.0750 | Infinity | Air | | | 9.662 |
| 88 | E23 | 38 | | 0.6000 | Infinity | Glass | SBSL7 | 516641 | 9.691 |
| 88 | E24 | 39 | | 1.2011 | Infinity | Liquid | WATER | | 9.676 |
| 88 | E25 | 40 | F1 | 3.1684 | TABLE 11 | Liquid | OIL | T30004091-AB | 9.644 |
| | | | F2 | | TABLE 11 | | | | |
| | | | F3 | | TABLE 11 | | | | |
| 88 | E26 | 41 | | 0.6000 | Infinity | Glass | SBSL7 | 516641 | 9.570 |
| 88 | | 42 | | 0.0750 | Infinity | Air | | | 9.549 |
| 89 | E27 | 43 | | 0.6000 | Infinity | Glass | SBSL7 | 516641 | 10.051 |
| 89 | E28 | 44 | | 1.2011 | Infinity | Liquid | WATER | | 10.036 |
| 89 | E29 | 45 | F1 | 3.1684 | TABLE 12 | Liquid | OIL | T30004091-AB | 9.988 |
| | | | F2 | | TABLE 12 | | | | |
| | | | F3 | | TABLE 12 | | | | |
| 89 | E30 | 46 | | 0.6000 | Infinity | Glass | SBSL7 | 516641 | 9.893 |
| 89 | | 47 | | 0.0750 | Infinity | Air | | | 9.869 |
| 90 | E31 | 48 | | 0.6000 | Infinity | Glass | SBSL7 | 516641 | 9.901 |
| 90 | E32 | 49 | | 1.2011 | Infinity | Liquid | WATER | | 9.885 |
| 90 | E33 | 50 | F1 | 3.1684 | TABLE 13 | Liquid | OIL | T30004091-AB | 9.830 |
| | | | F2 | | TABLE 13 | | | | |
| | | | F3 | | TABLE 13 | | | | |
| 90 | E34 | 51 | | 0.6000 | Infinity | Glass | SBSL7 | 516641 | 9.735 |
| 90 | | 52 | | 0.0750 | Infinity | Air | | | 9.710 |
| 91 | E35 | 53 | | 3.6122 | 19.2354 | Glass | SNPH1 | 808228 | 5.281 |
| 91 | E36 | 54 | | 5.6250 | −12.3087 | Glass | SLAH58 | 883408 | 4.996 |

TABLE 5-continued

Optical Prescription

| Group | Item | Surface | Focus Position | Separation (mm) | Radius of Curvature (mm) | Type | Material Name | Code | Aperture Diameter/2 (mm) |
|---|---|---|---|---|---|---|---|---|---|
| 91 | | 55 | | 3.1160 | *−47.2988 | Air | | | 4.142 |
| 92 | | 56 | | 0.0000 | Infinity | Air | | | 2.995 |

All surfaces in groups 87 and 88 are decentered along the y-axis by −4.3915 mm and +4.3915 mm, respectively, and all surfaces in groups 89 and 90 are decentered along the x-axis by −3.9888 mm and +3.9888 mm, respectively. All other surfaces are aligned on the optical axis. The asterisk (*) for surfaces 4, 7 and 53 indicate that these are aspheric surfaces. The coefficients for surface 4 are:

$\kappa = -0.5673$
$A = +0.9038 \times 10^{-6}$
$B = +0.2657 \times 10^{-8}$
$C = -0.1105 \times 10^{-10}$
$D = +0.4301 \times 10^{-13}$
$E = -0.8236 \times 10^{-16}$
$F = +0.6368 \times 10^{-19}$ The coefficients for surface 7 are:

$\kappa = -0.0000$
$A = +0.5886 \times 10^{-4}$
$B = -0.5899 \times 10^{-6}$
$C = +0.8635 \times 10^{-8}$
$D = -0.5189 \times 10^{-10}$
$E = -0.1186 \times 10^{-11}$
$F = +0.1631 \times 10^{-13}$ The coefficients for surface 53 are:

$\kappa = -0.0000$
$A = -0.5302 \times 10^{-4}$
$B = +0.8782 \times 10^{-6}$
$C = +0.7761 \times 10^{-7}$
$D = -0.1700 \times 10^{-8}$
$E = -0.1965 \times 10^{-9}$
$F = +0.6903 \times 10^{-11}$ The focal lengths of lens system 80 for zoom positions Z1-Z8 at focus position F1 are 6.0003, 7.6131, 11.4304, 15.2474, 19.1105, 30.4619, 41.4244, and 44.9809. The corresponding F-numbers for zoom positions Z1-Z8 are 2.80, 2.90, 3.05, 3.25, 3.45, 3.70, 3.95 and 4.00.

For Focus Position F1 the Object Plane is assumed to be at infinity, for F2 the Object Plane is at an intermediate distance of about 1016.25 mm, and for F3 the Object Plane is at a close distance of about 378.75 mm (i.e., 378.75 mm away from the image plane). The lens groups 81, 84, 86 and 91 remain in the same position throughout the full range of movement of the zoom lens group 82.

Figure 8A:
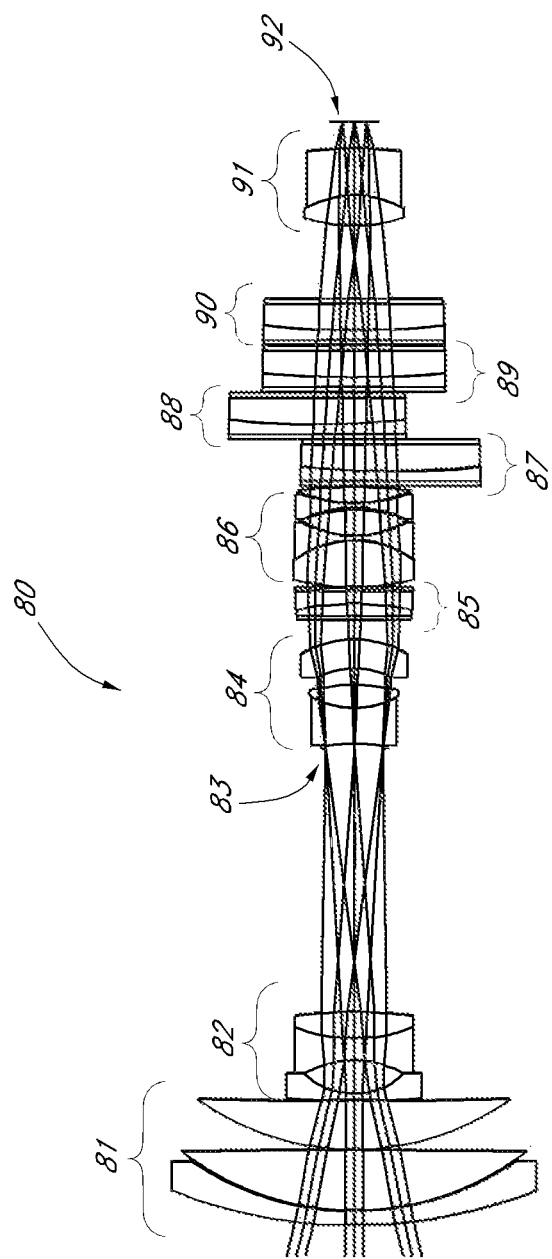
FIGS. 8A, 8B and 8C are optical diagrams of the lens system of FIGS. 7A and 7B illustrating different positions of the zoom lens groups and surface shapes between the liquids to produce different focal lengths and focus distances.
Figure 8B:
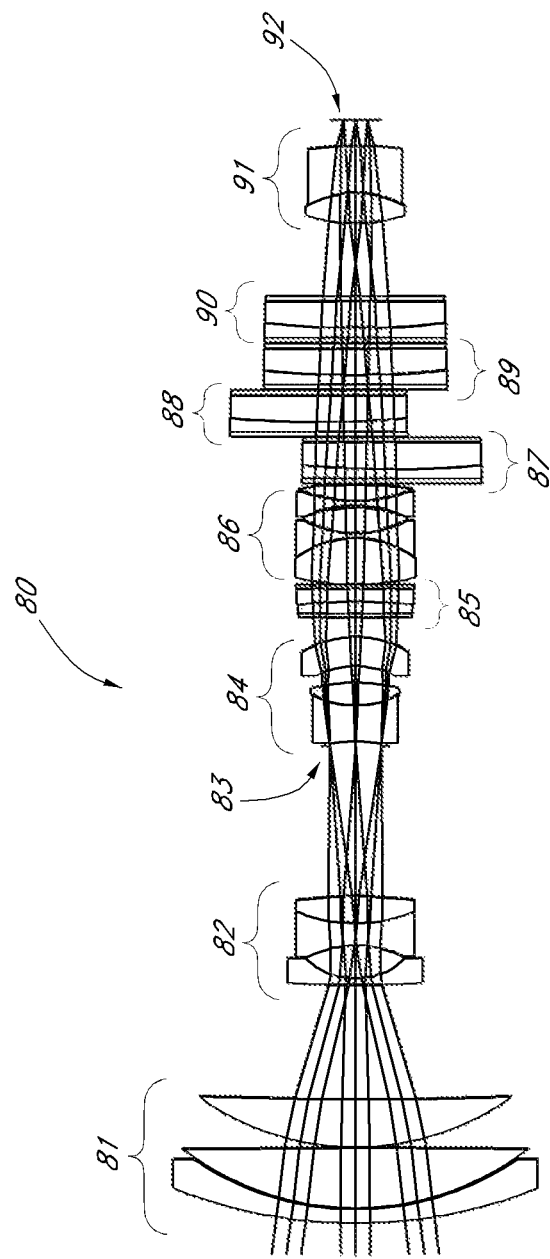
Figure 8C:
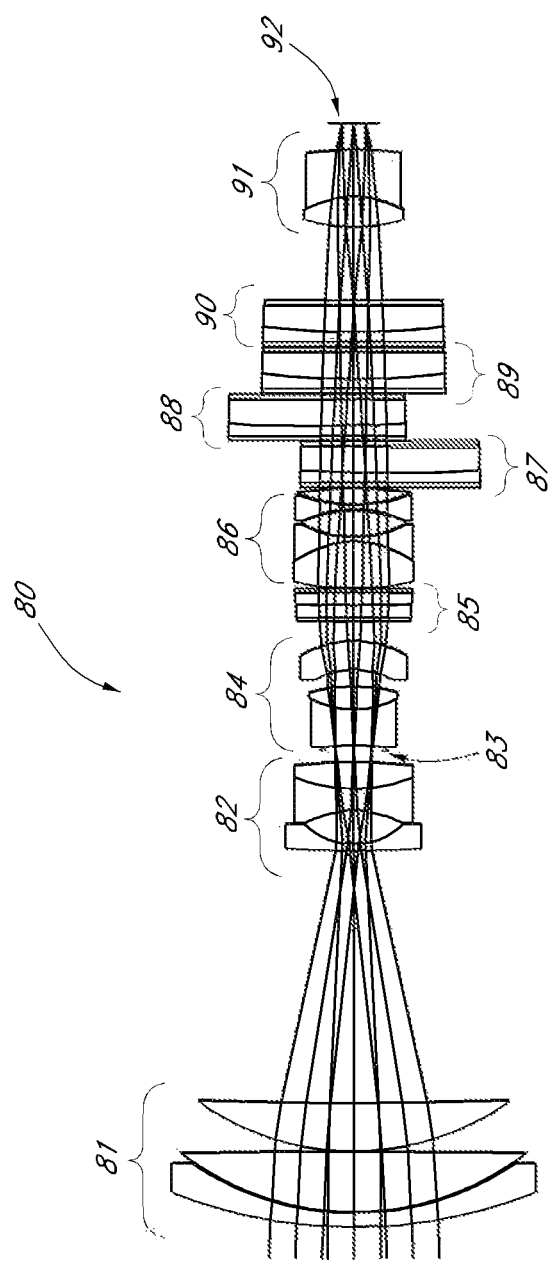

FIGS. 8A, 8B and 8C are optical diagrams of the lens system 80 showing exemplary zoom and focus positions. In FIG. 8A, the lens system 80 is configured for Focus Position F1 (object plane is at infinity) and Zoom Position Z1 (F-number is 2.80). In FIG. 8B, the lens system 80 is configured for Focus Position F2 (object plane is at 1016.25 mm) and Zoom Position Z3 (F-number is 3.05). In FIG. 8C, the lens system 80 is configured for Focus Position F3 (object plane is at 378.75 mm) and Zoom Position Z8 (F-number is 4.00).

TABLE 6 provides the separation values for the last lens surface in lens group 81 and the first lens surface in lens group 82 for focus positions F1-F3 and zoom positions Z1-Z8.

TABLE 6

Separation Values Between 81 and 82

| | Z1 | Z2 | Z3 | Z4 | Z5 | Z6 | Z7 | Z8 |
|---|---|---|---|---|---|---|---|---|
| F1 | 0.0832 | 5.7132 | 13.7126 | 18.4633 | 21.6974 | 27.4007 | 30.5400 | 31.3096 |
| F2 | 0.0902 | 5.7486 | 13.6468 | 18.3289 | 21.5154 | 27.0776 | 30.0174 | 30.7361 |
| F3 | 0.0750 | 5.6942 | 13.4674 | 18.1217 | 21.3355 | 26.7467 | 29.5798 | 30.2701 |

TABLE 7 provides the separation values for the last lens surface in lens group 82 and the iris 83 for focus positions F1-F3 and zoom positions Z1-Z8.

TABLE 7

Separation Values Between 82 and 83

| | Z1 | Z2 | Z3 | Z4 | Z5 | Z6 | Z7 | Z8 |
|---|---|---|---|---|---|---|---|---|
| F1 | 31.5294 | 25.8992 | 17.8996 | 13.1486 | 9.9140 | 4.2101 | 1.0701 | 0.3000 |
| F2 | 31.5178 | 25.8581 | 17.9590 | 13.2762 | 10.0892 | 4.5268 | 1.5870 | 0.8729 |
| F3 | 31.5324 | 25.9120 | 18.1380 | 13.4831 | 10.2689 | 4.8577 | 2.0248 | 1.3384 |

TABLE 8 provides the diameter of the iris for focus positions F1-F3 and zoom positions Z1-Z8 of lens system 80.

TABLE 8

| | \multicolumn{8}{c}{Iris Diameter} | | | | | | | |
|---|---|---|---|---|---|---|---|---|
| | Z1 | Z2 | Z3 | Z4 | Z5 | Z6 | Z7 | Z8 |
| F1 | 6.8689 | 6.5249 | 6.0962 | 5.6645 | 5.3219 | 4.9624 | 4.6915 | 4.6532 |
| F2 | 6.8405 | 6.5175 | 6.0861 | 5.6557 | 5.2920 | 4.8816 | 4.5571 | 4.5206 |
| F3 | 6.8181 | 6.5033 | 6.0661 | 5.6219 | 5.2403 | 4.7783 | 4.4132 | 4.3444 |

TABLES 9-13 provide the radii of curvature for liquid lens cells 85, 87, 88, 89 and 90 for focus positions F1-F3 and zoom positions Z1-Z8 of lens system 80.

TABLE 9

| | Liquid Lens Cell 85 Curvature | | | | | | | |
|---|---|---|---|---|---|---|---|---|
| | Z1 | Z2 | Z3 | Z4 | Z5 | Z6 | Z7 | Z8 |
| F1 | −33.9902 | −40.9700 | −60.9667 | −84.8892 | −106.7630 | −101.7297 | −58.3998 | −48.6792 |
| F2 | −34.3890 | −42.0587 | −65.5384 | −101.1799 | −154.9184 | −370.2777 | −263.5374 | −212.3139 |
| F3 | −35.0134 | −43.6001 | −72.6330 | −133.7178 | −351.2333 | 214.4454 | 125.5481 | 115.8049 |

TABLE 10

| | Liquid Lens Cell 87 Curvature | | | | | | | |
|---|---|---|---|---|---|---|---|---|
| | Z1 | Z2 | Z3 | Z4 | Z5 | Z6 | Z7 | Z8 |
| F1 | 102.5591 | 118.4781 | 117.4984 | 114.8844 | 103.1855 | 99.1788 | 111.2567 | 118.9702 |
| F2 | 116.0979 | 120.8199 | 118.4138 | 110.3387 | 105.4622 | 105.8294 | 116.9056 | 104.4870 |
| F3 | 125.4857 | 126.5081 | 134.1777 | 117.6565 | 117.0787 | 126.2995 | 145.9466 | 152.4400 |

TABLE 11

| | Liquid Lens Cell 88 Curvature | | | | | | | |
|---|---|---|---|---|---|---|---|---|
| | Z1 | Z2 | Z3 | Z4 | Z5 | Z6 | Z7 | Z8 |
| F1 | 93.9427 | 107.5303 | 107.7701 | 106.8706 | 97.5084 | 95.8461 | 104.8436 | 108.5809 |
| F2 | 102.4836 | 107.8382 | 106.2717 | 100.5026 | 97.6282 | 101.0075 | 111.6798 | 104.0436 |
| F3 | 111.5822 | 110.9116 | 94.5008 | 101.6873 | 102.7035 | 119.1600 | 146.3138 | 155.5935 |

TABLE 12

| | Liquid Lens Cell 89 Curvature | | | | | | | |
|---|---|---|---|---|---|---|---|---|
| | Z1 | Z2 | Z3 | Z4 | Z5 | Z6 | Z7 | Z8 |
| F1 | 113.3675 | 92.6206 | 99.3336 | 104.1798 | 122.1950 | 118.7964 | 88.3338 | 79.6583 |
| F2 | 94.2380 | 92.5926 | 101.7948 | 117.8766 | 130.3253 | 125.2099 | 101.0682 | 112.6550 |
| F3 | 85.9634 | 91.2575 | 109.5104 | 120.2033 | 127.2392 | 108.9338 | 88.7114 | 84.6877 |

TABLE 13

| | Liquid Lens Cell 90 Curvature | | | | | | | |
|---|---|---|---|---|---|---|---|---|
| | Z1 | Z2 | Z3 | Z4 | Z5 | Z6 | Z7 | Z8 |
| F1 | 92.0520 | 81.7616 | 88.9468 | 96.1130 | 117.8374 | 119.5041 | 86.4587 | 76.4900 |
| F2 | 81.8570 | 81.1371 | 90.3718 | 106.1190 | 118.5283 | 118.2341 | 94.7431 | 108.6137 |
| F3 | 75.0422 | 77.4766 | 87.3137 | 98.8610 | 104.4282 | 100.8203 | 87.2180 | 83.8997 |

The values provided in TABLES 9-13 are for conditions when the image is stable, and no correction for jitter is needed. When jitter is detected, the radii of curvature for the liquid lens cells are adjusted to compensate. TABLE 14 provides the radii of curvature for liquid lens cells 85, 87, 88, 89 and 90 at Focus Positions F2 and Zoom Position Z8 of lens system 80 for exemplary offsets in the x-direction of −0.5000 degrees and 0.5000 degrees and in the y-direction of 0.4500 degrees and −0.4500 degrees.

TABLE 14

Liquid Lens Cell Stabilization at Zoom Position 8 and Focus Position 2

| y offset (degrees) | x offset (degrees) | Curvature 85 | Curvature 87 | Curvature 88 | Curvature 89 | Curvature 90 |
|---|---|---|---|---|---|---|
| +0.5000 | 0.0000 | −212.3139 | 58.4594 | −275.2157 | 88.1999 | 78.5201 |
| −0.5000 | 0.0000 | −212.3139 | −3112.4429 | 45.3929 | 109.7978 | 121.1403 |
| 0.0000 | +0.4500 | −212.3139 | 128.0860 | 193.7925 | 40.6736 | −1791.4629 |
| 0.0000 | −0.4500 | −212.3139 | 84.8003 | 101.7532 | −191.6639 | 43.2782 |

Figure 9A:
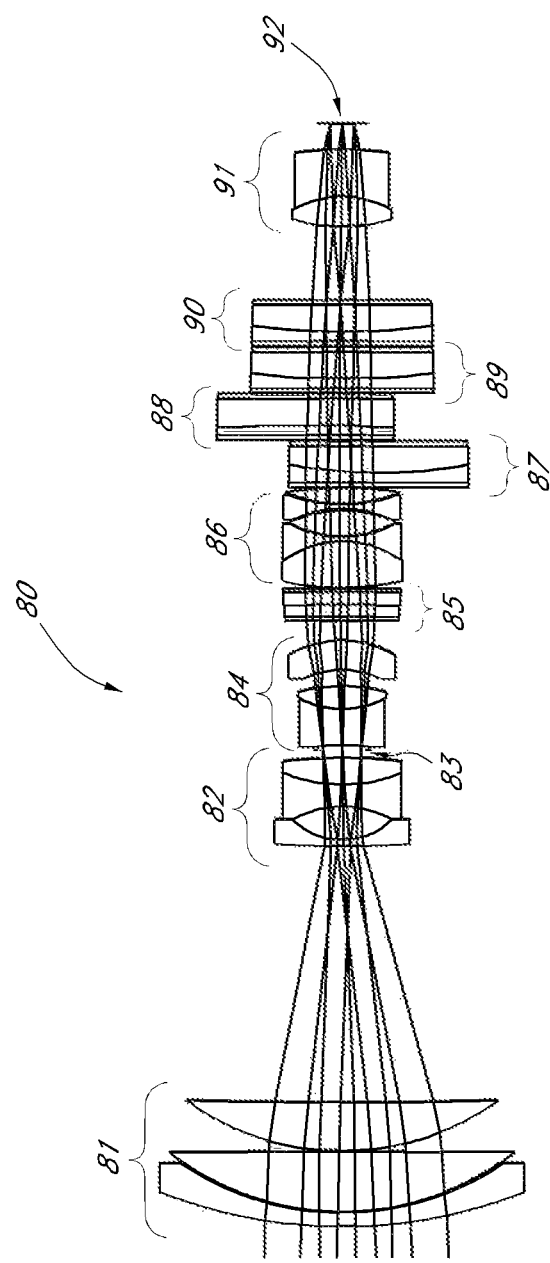
FIGS. 9A, 9B, 9C and 9D are optical diagrams of the lens system of FIGS. 7A and 7B illustrating different positions of the zoom lens groups and surface shapes between the liquids to stabilize an image.
Figure 9B:
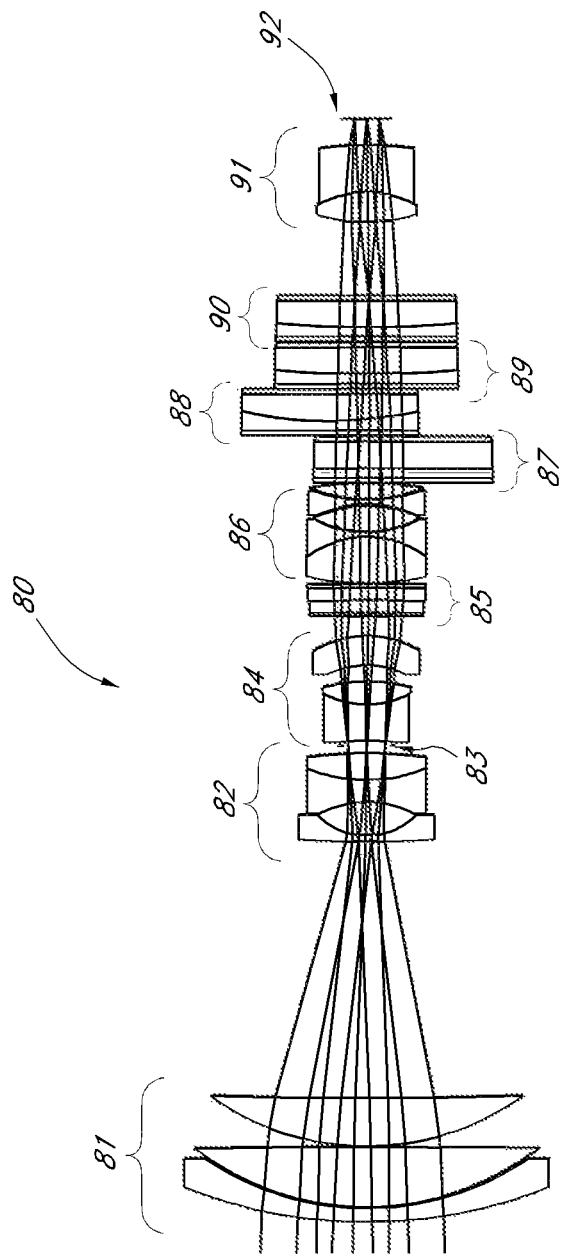
Figure 9C:
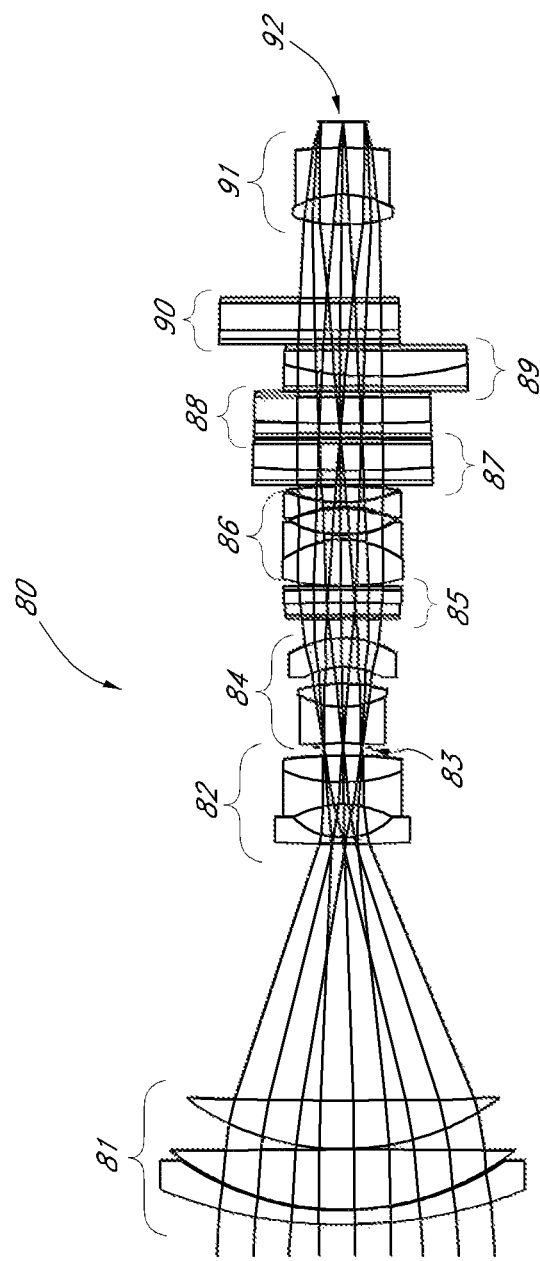
Figure 9D:
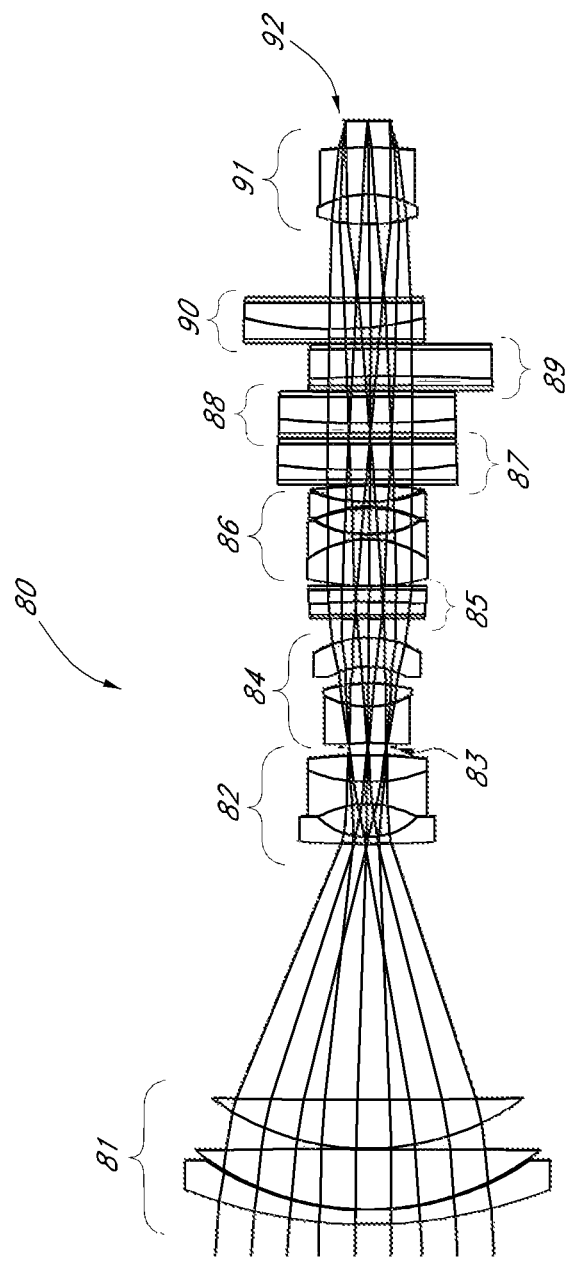

FIGS. 9A, 9B, 9C and 9D are optical diagrams of the lens system 80 configured as shown in TABLE 14. FIG. 9A illustrates image stabilization for an offset in the y-direction of +0.5000 degrees. FIG. 9B illustrates image stabilization for an offset in the y-direction of −0.5000 degrees. FIG. 9C illustrates image stabilization for an offset in the x-direction of +0.4500 degrees. FIG. 9D illustrates image stabilization for an offset in the x-direction of −0.4500 degrees.

TABLE 15 provides the radii of curvature for liquid lens cells 85, 87, 88, 89 and 90 at Focus Positions F1 and Zoom Position Z4 of lens system 80 for exemplary offsets in the x-direction of +1.5000 degrees and −1.5000 degrees and in the y-direction of +1.2200 degrees and −1.2200 degrees.

TABLE 15

Liquid Lens Cell Stabilization at Zoom Position 4 and Focus Position 1

| y offset (degrees) | x offset (degrees) | Curvature 85 | Curvature 87 | Curvature 88 | Curvature 89 | Curvature 90 |
|---|---|---|---|---|---|---|
| +1.5000 | 0.0000 | −84.8892 | 51.5591 | −271.8934 | 143.7170 | 72.8023 |
| −1.5000 | 0.0000 | −84.8892 | −762.4547 | 42.5943 | 103.3767 | 143.1168 |
| 0.0000 | +1.2200 | −84.8892 | 140.6245 | 113.4484 | 43.9052 | −341.3372 |
| 0.0000 | −1.2200 | −84.8892 | 86.3979 | 81.3499 | −145.4669 | 46.5625 |

Figure 10B:
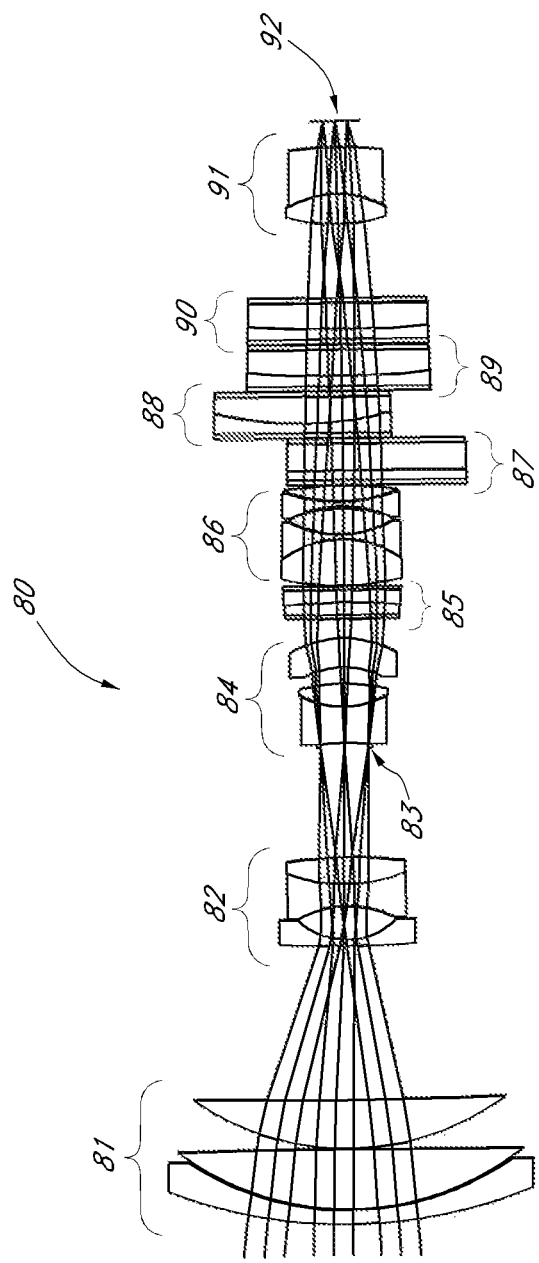
Figure 10C:
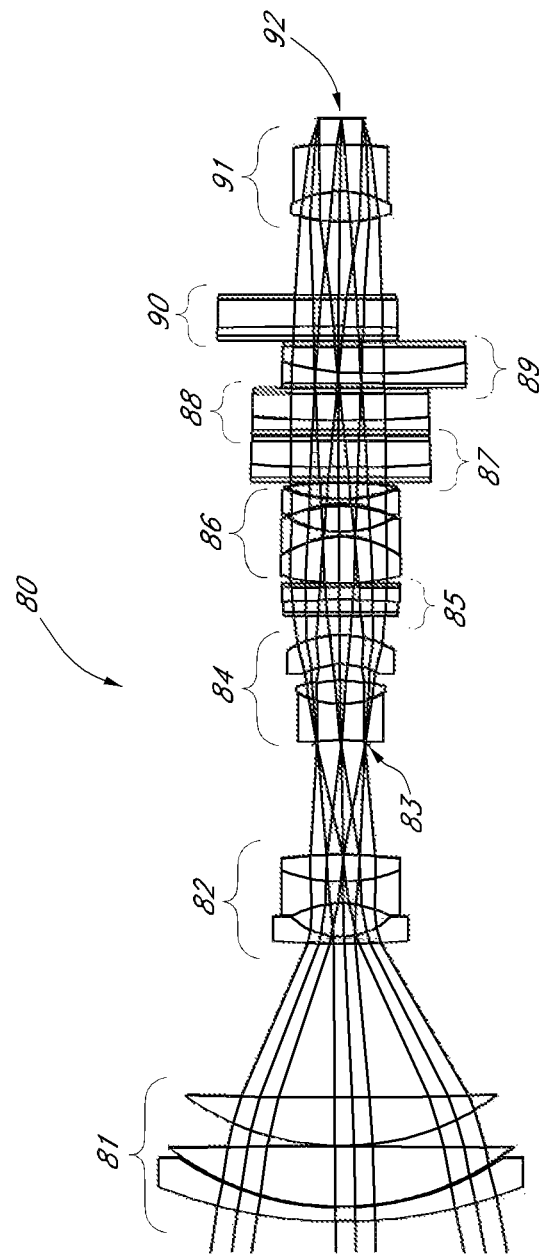
Figure 10D:
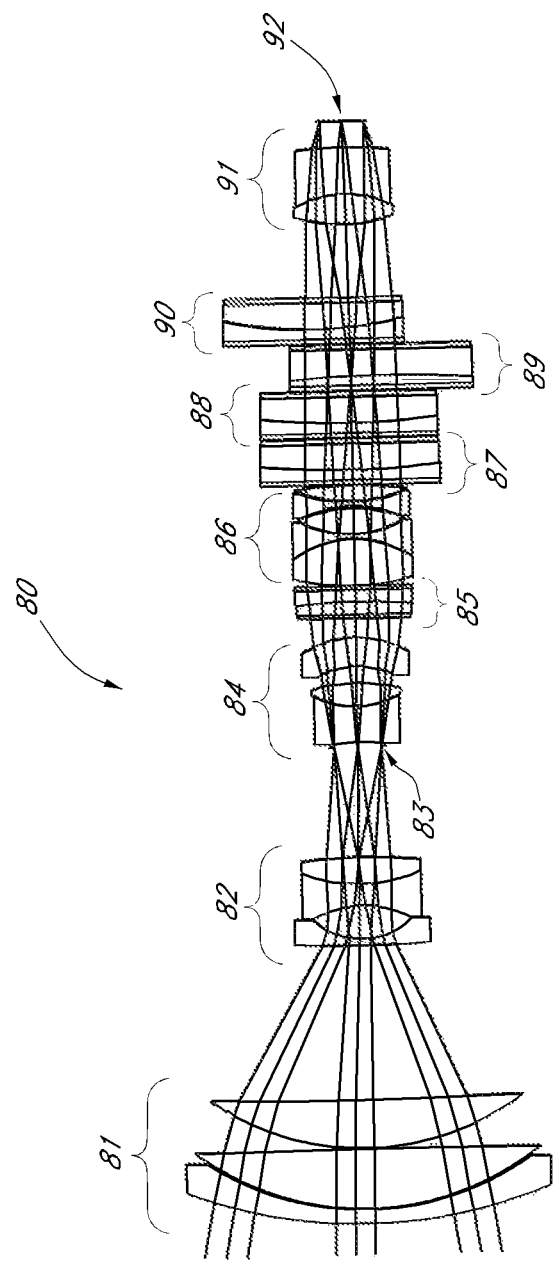

FIGS. 10A, 10B, 10C and 10D are optical diagrams of the lens system 80 configured as shown in TABLE 15. FIG. 10A illustrates image stabilization for an offset in the y-direction of −1.5000 degrees. FIG. 10B illustrates image stabilization for an offset in the y-direction of +1.5000 degrees. FIG. 10C illustrates image stabilization for an offset in the x-direction of +1.2200 degrees. FIG. 10D illustrates image stabilization for an offset in the x-direction of −1.2200 degrees.

The optical power and focal length ranges of the liquid lens cell data given in TABLES 5-15 is as follows: first cell 85 is negative to positive and −185.198 mm to +630.972 mm, second cell 87 is positive to negative and +280.924 mm to −4154.291 mm, third cell 88 is positive to negative and +232.078 mm to −1481.432 mm, fourth cell 89 is positive to negative and +221.613 mm to −792.587 mm and the fifth cell 90 is positive to negative and +235.804 mm to −1859.801 mm.

Figure 11A:
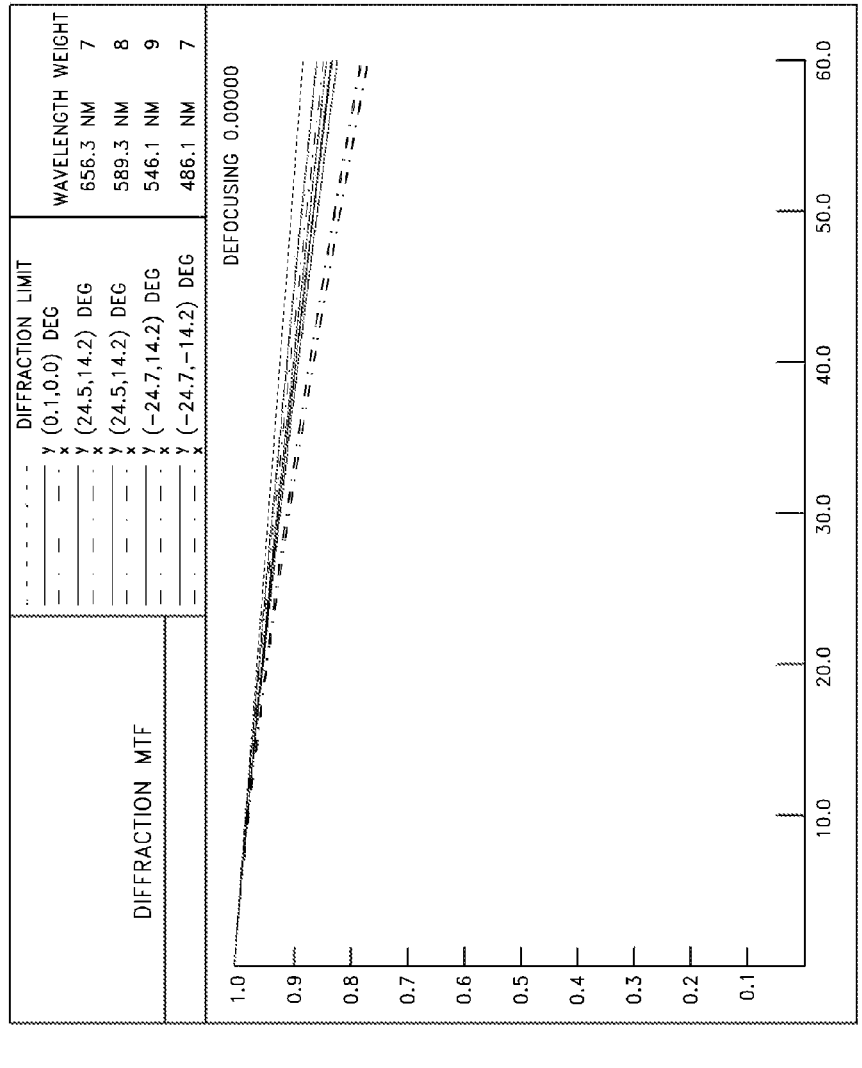
FIGS. 11A, 11B and 11C are modulation transfer function performance diagrams of the lens system as configured in FIGS. 8A, 8B and 8C.
Figure 11B:
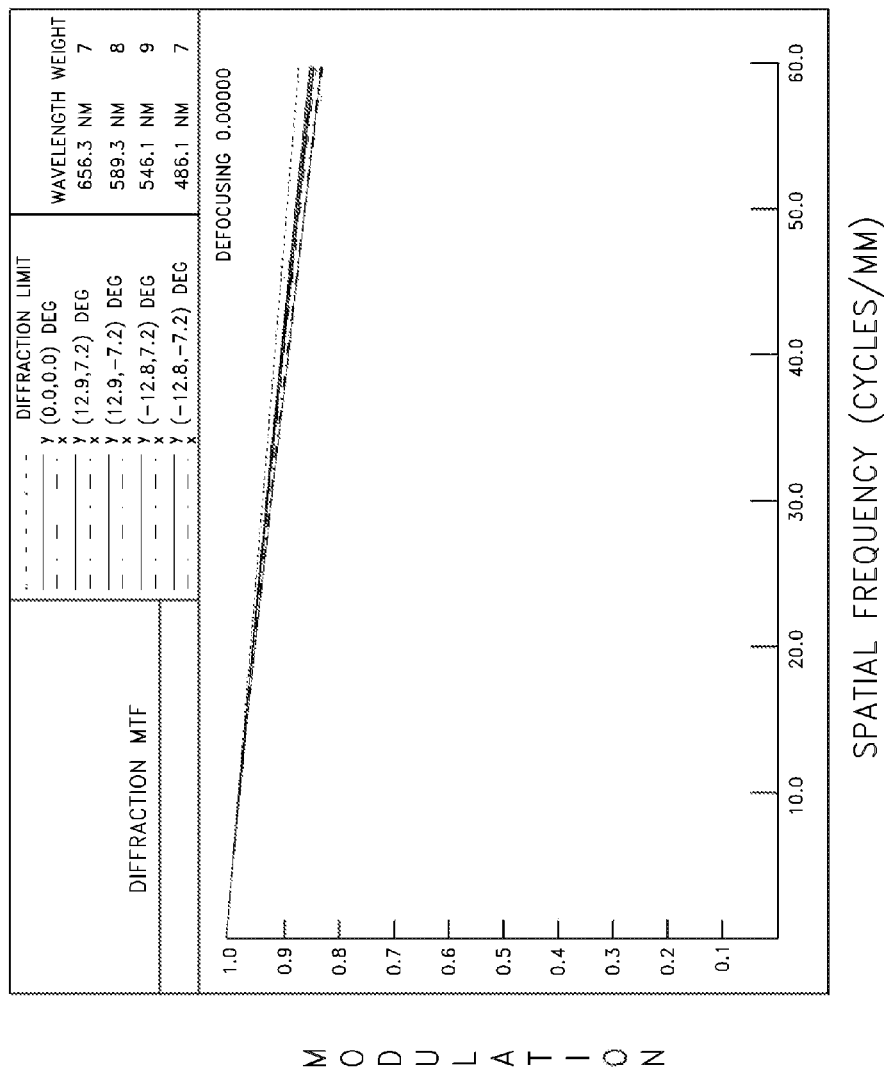
Figure 11C:
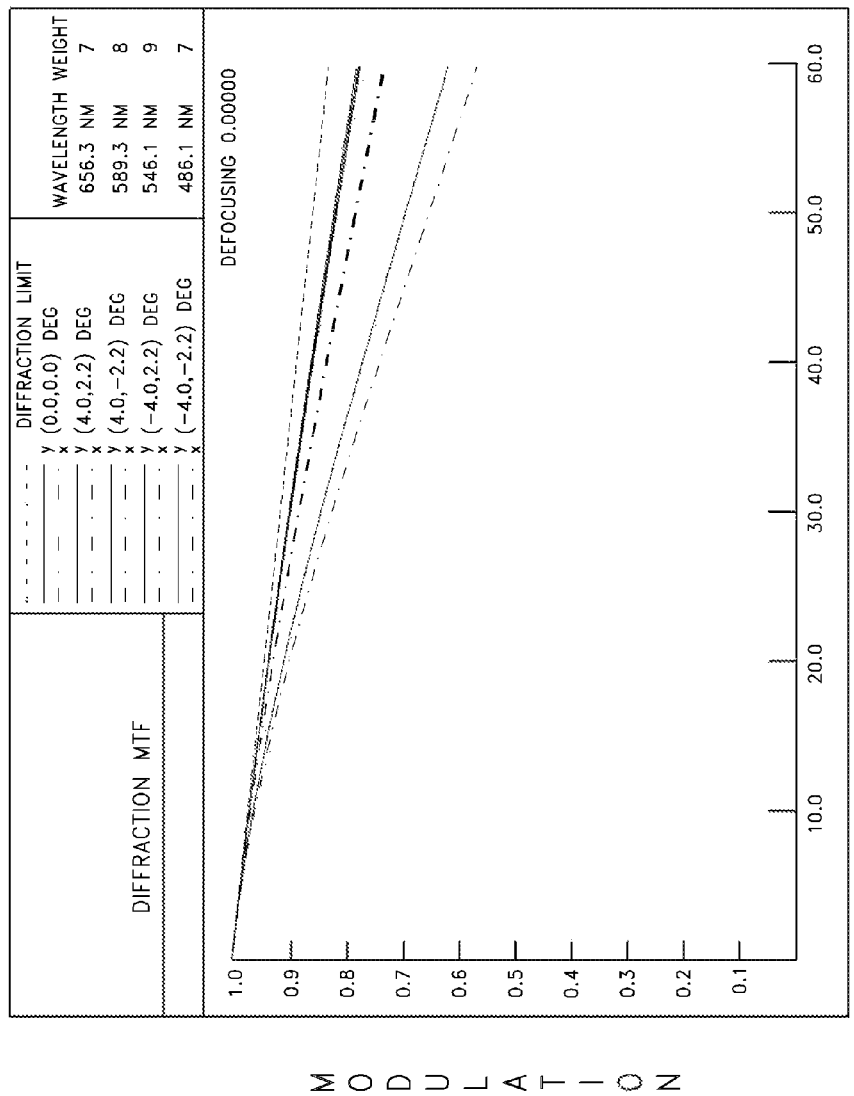
Figure 12A:
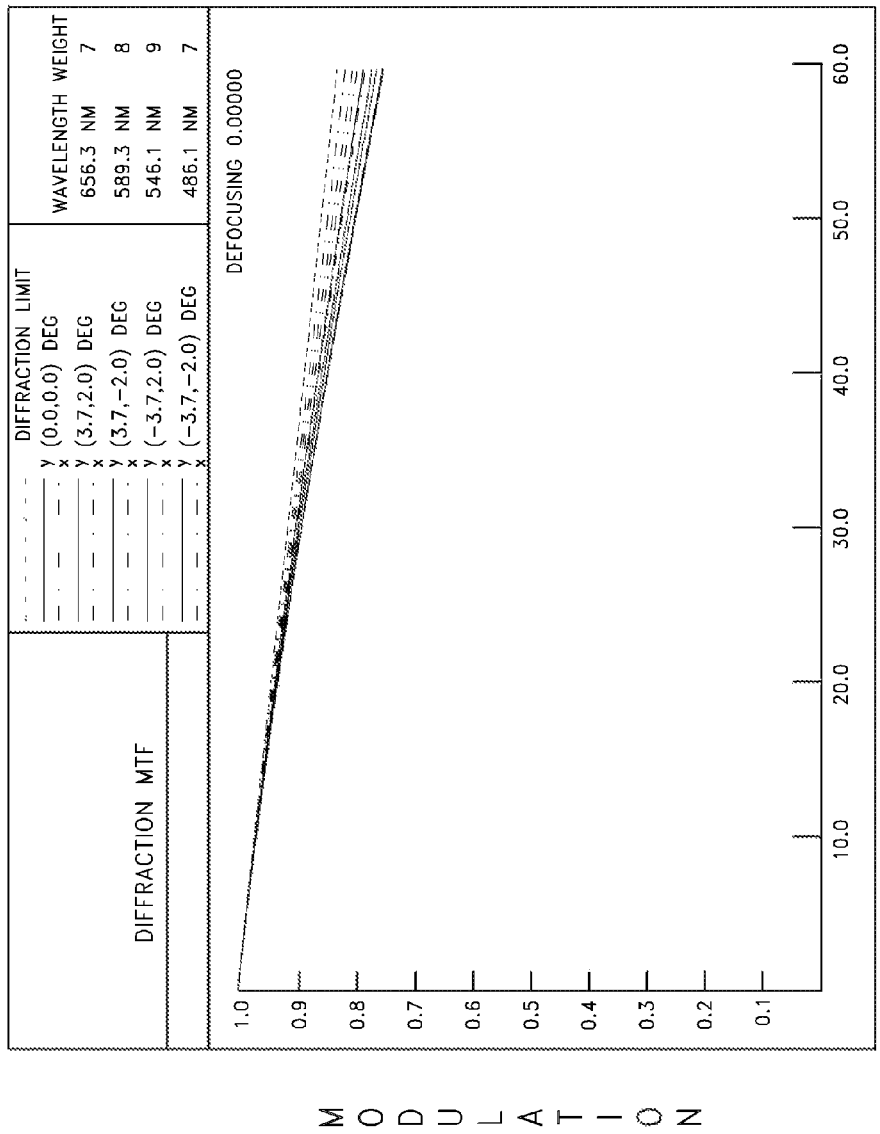
FIGS. 12A, 12B, 12C and 12D are modulation transfer function performance diagrams of the lens system as configured in FIGS. 9A, 9B, 9C and 9D.
Figure 12B:
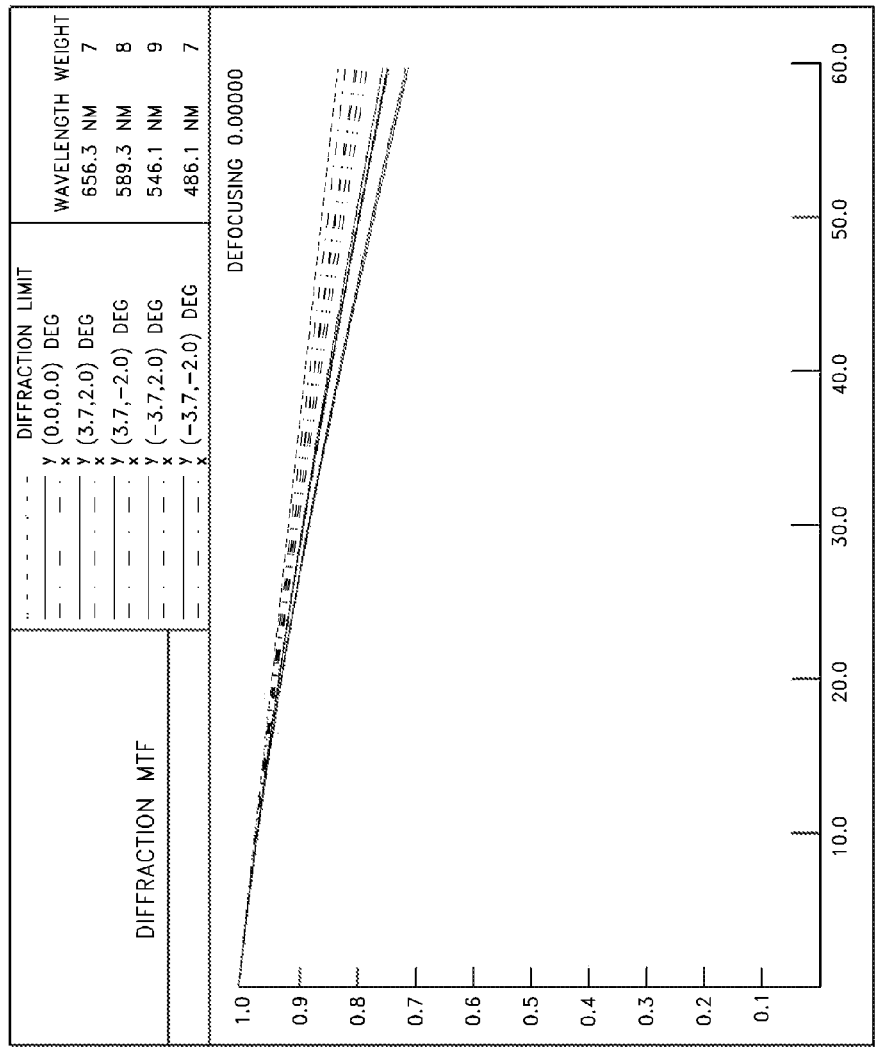
Figure 12C:
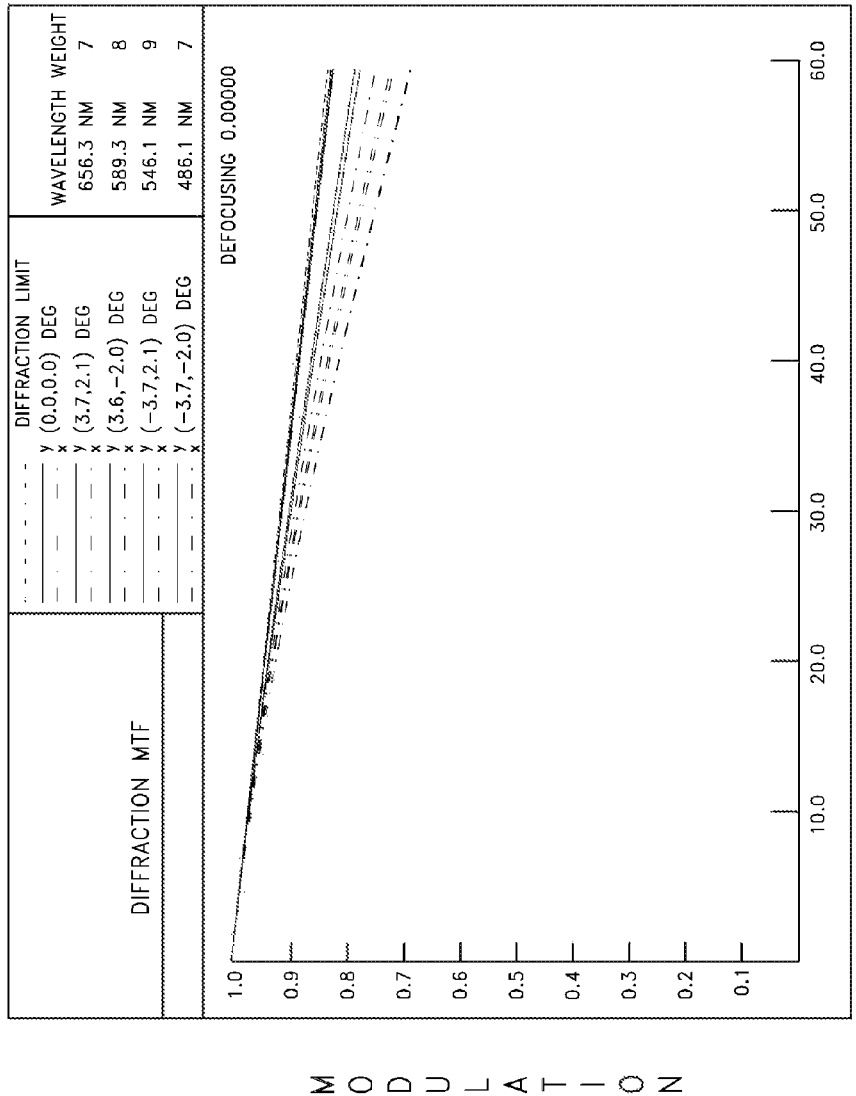
Figure 12D:
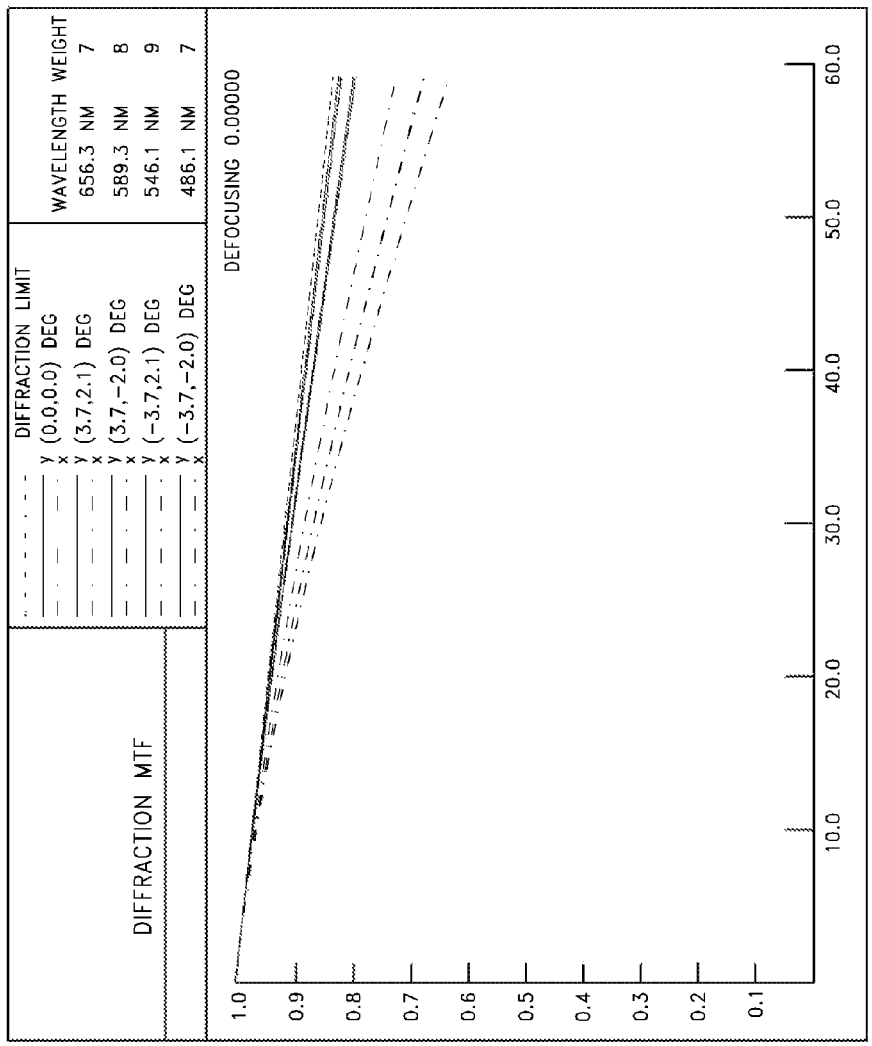
Figure 13A:
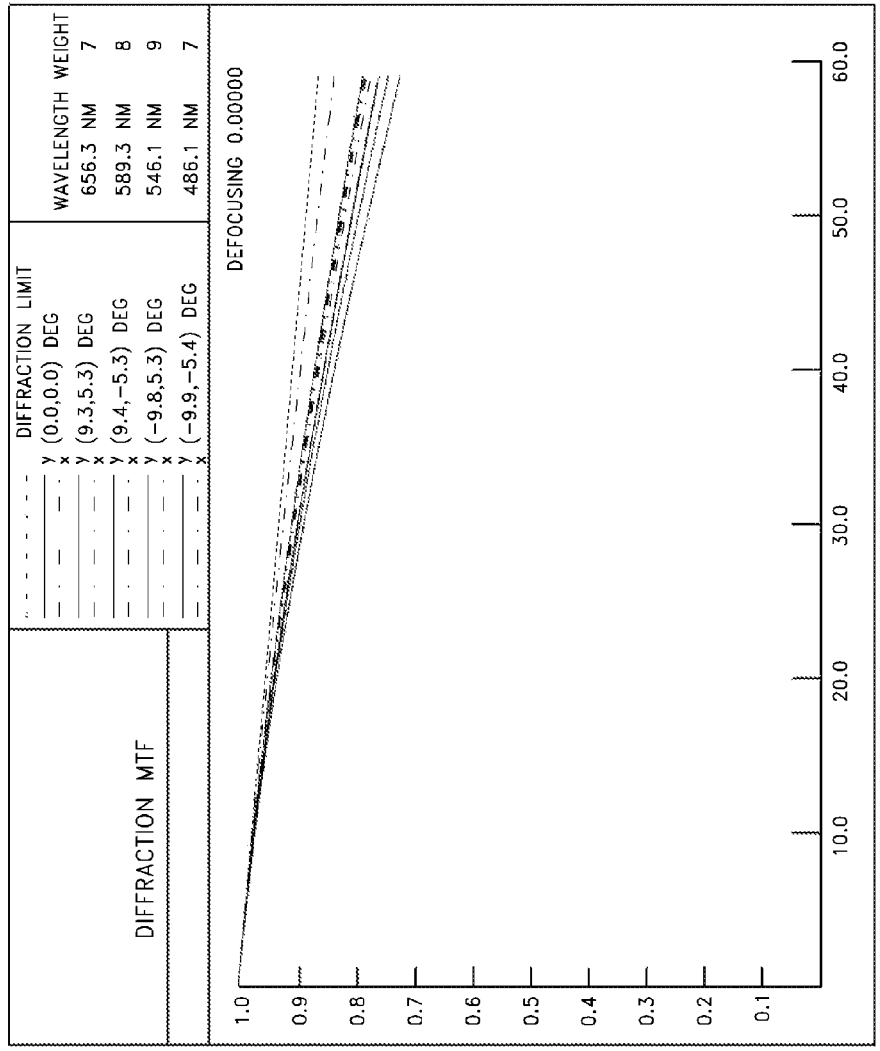
FIGS. 13A, 13B, 13C and 13D are modulation transfer function performance diagrams of the lens system as configured in FIGS. 10A, 10B, 10C and 10D.
Figure 13B:
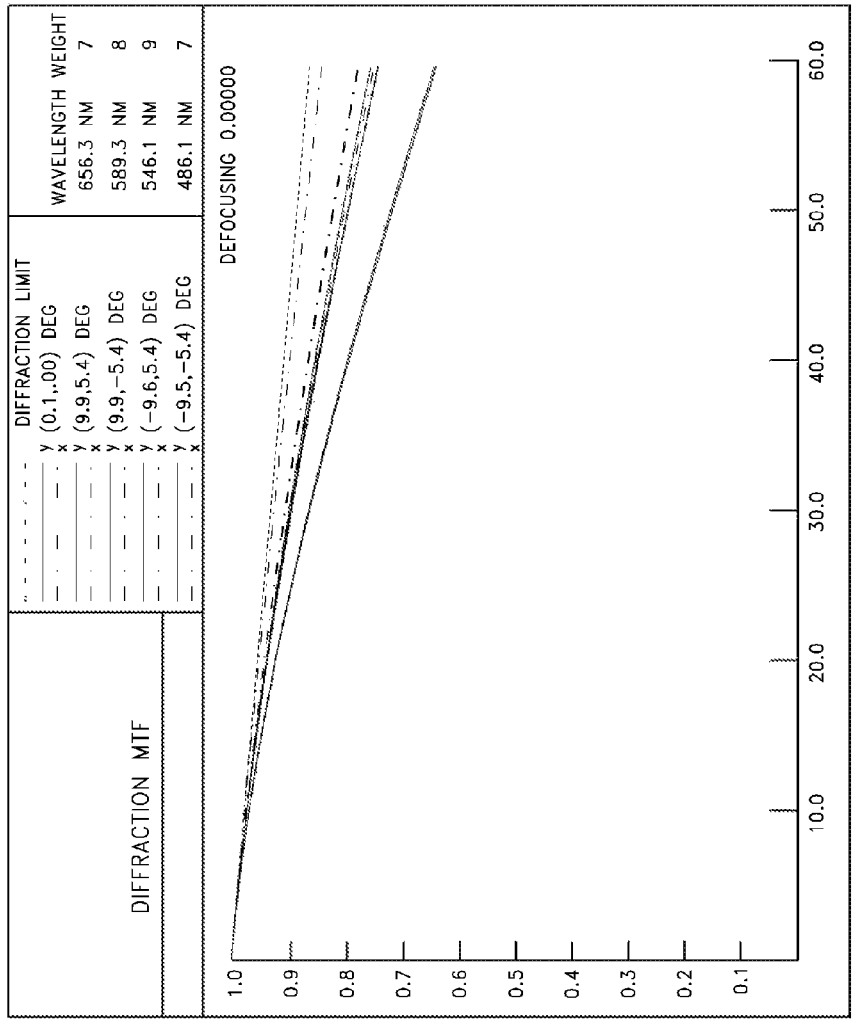
Figure 13C:
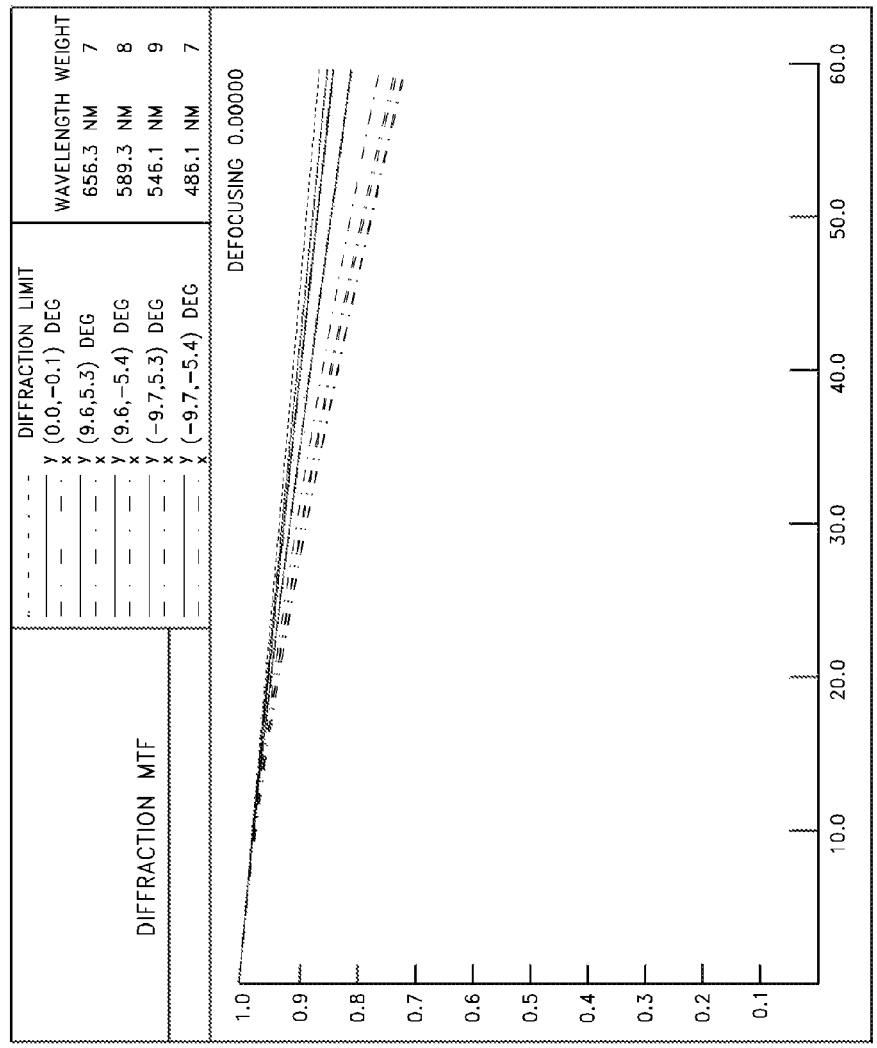
Figure 13D:
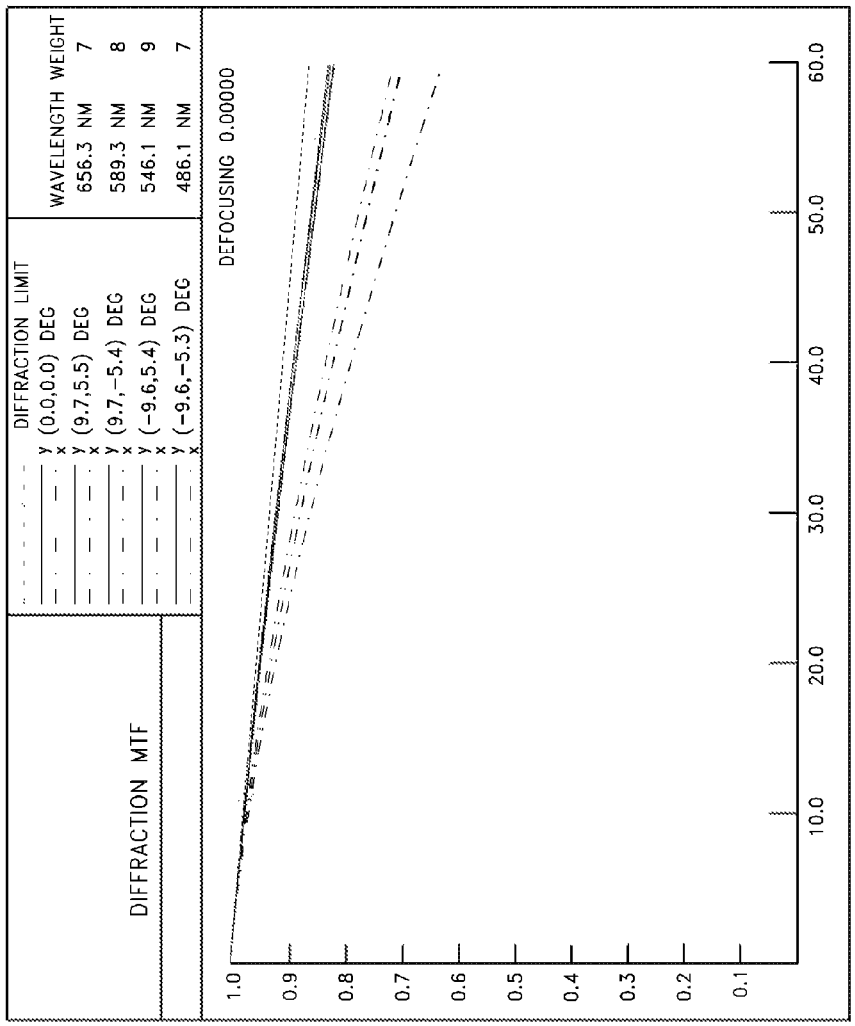

The optical performance of lens system 80 is given in FIGS. 11A-11C, 12A-12D, and 13A-13D. FIGS. 11A-11C correspond to the optical configuration illustrated in FIGS. 8A-8C. FIGS. 12A-12D correspond to the optical configuration illustrated in FIGS. 9A-9D. FIGS. 13A-13D correspond to the optical configuration illustrated in FIGS. 10A-10D.

The diffraction based polychromatic modulation transfer function ("MTF") data (modulation versus spatial frequency) is shown in percent (%) for five different Field Positions in three different combinations of the zoom and focus positions set forth in TABLE 5, namely (Z1, F1), (Z3, F2) and (Z8, F3) which are representative examples. The five Field Positions (axis and four corners) are set forth as x-y field angles in degrees. The MTF percentages are at the wavelengths and weightings set forth in the top right-hand corner of FIGS. 11A-11C, 12A-12D and 13A-13D and are graphically shown for x and y directions of measurement at the image plane 92.

Lens system 80 has similar distortion characteristics as that given for lens system 60 with a slightly increased full field distortion which is slightly asymmetric due to the decentered liquid lens cells. The lens system 80 is substantially unvignetted and the corresponding relative illumination is very high and similar to that given for the lens system 60. The lens system 80 has a breathing characteristic substantially similar to that given for the lens system 60.

The maximum spatial frequency shown is 60 cycles/mm which given the image diameter of about 6 mm and choice of detector pixel size may provide high quality images at least up to approximately standard definition television (SDTV) resolution, namely 720 pixels horizontally by 480 pixels vertically. At the long focal length, close focus position (Z8, F3), which is usually less important in practice than the far and intermediate distance positions, F1 and F2, the optical performance (MTF) reduces to about 55% in FIG. 11C. However, at larger distances and with stabilization operating, the optical performance (MTF) is maintained above about 60%. Movable lens group 82 may axially move during stabilization, and the variable radii of curvature of the liquid lens cells may independently change during stabilization, allowing realization of optical performance up to or exceeding 90 cycles/mm which is approximately equivalent to HDTV resolution.

FIGS. 12A-12D correspond to the optical configuration illustrated in FIGS. 9A-9D.

FIGS. 13A-13D correspond to the optical configuration illustrated in FIGS. 10A-10D.

The embodiment illustrated in FIGS. 7-10 utilizes a liquid lens cell 85 for focus, zoom and thermal compensation; liquid lens cells 87 and 88 primarily for stabilization of the incoming radiation deviated in the y-direction; and liquid lens cells 89 and 90 primarily for stabilization for stabilization of the incoming radiation deviated in the x-direction. Movable lens group 82 primarily provides zooming. In another embodiment, liquid lens cell 85 may be removed from the system, and the remaining liquid lens cells 87, 88, 89 and 90 could provide for zooming, focusing and stabilization. Liquid lens cell 85 could also be replaced with non-liquid lens elements. Furthermore, the movable lens group 82 may be allowed to axially move during stabilization, all of the liquid lens cell variable radii of curvature may change during stabilization or both. This may improve the optical performance of lens system 80, especially at the corner of the field of view during stabilization.

Instead of using two pairs of liquid lens cells, the lens system 80 could employ a pair of liquid lens cells to provide stabilization in a single direction. For example, it may be desirable to reduce vertical jitter, while jitter in the horizontal direction may be better tolerated.

The size of offset of a liquid lens cell from the optical axis determines, to some extent, the amount of stabilization that can be provided by that liquid lens cell. However, the effective aperture diameter decreases as a liquid lens cell is moved away from the optical axis. In one embodiment, a first pair of liquid lens cells is offset from the optical axis by an amount that is different from the offset for a second pair of liquid lens cells. A first pair of liquid lens cells could provide greater stabilization in the vertical direction because of an increased offset, while a second pair of liquid lens cells provides less stabilization but a larger aperture in the horizontal direction because of a decreased offset from the optical axis.

Various types of sensors may be used to detect motion of the lens system. For example, angular velocity sensors, piezoelectric gyro sensors, acceleration sensors, or optical detecting sensors may be used to detect motion. U.S. Pat. No. 6,992,700, incorporated herein by reference in its entirety, discloses examples of systems for detecting motion.

The motion sensors provide information to a controller that determines appropriate radii of curvature for liquid lens cells 85, 87, 88, 89 and 90. The controller also determines the appropriate position for lens group 82. U.S. Patent Application Publication 2006/0045504, incorporated herein by reference in its entirety, discloses control of a lens system. U.S. Pat. No. 6,987,529, incorporated herein by reference in its entirety, discloses another example for controlling a lens system.

The appropriate electronic signal levels for controlling the liquid lens cell radii can be determined in advance and placed in a lookup table. Alternatively, analog circuitry or a combination of circuitry and a lookup table can generate the appropriate signal levels. In one embodiment, a polynomial is used to determine the appropriate electronic signal levels. Points along the polynomial could be stored in a lookup table or the polynomial could be implemented with circuitry.

Although the figures illustrate image stabilization for a zoom lens, the image stabilization is also applicable to any optical radiation controlling device, such as a fixed focus lens, a zoom lens, an anamorphic lens, an optical relay system, and the like.

Liquid lens cells may also be used in combination with other optical elements to achieve stabilization. For example, a liquid lens cell may be paired with a prism to improve stabilization performance. Movement of lens elements may result in a shift in image location on a sensor, a tilt of the image on the sensor, or a shift in decentration. A liquid lens cell could be used to compensate for the tilt of the image on the sensor, and other lens elements could compensate for the shift in decentration or both tilt and decentration. A sensor could have extra pixels, and a motion detection algorithm, accelerometers, or gyroscopes could be used to determine the image location on the pixels and thereby compensate for image shift.

It is to be noted that various changes and modifications will become apparent to those skilled in the art Such changes and modifications are to be understood as being included within the scope of the invention as defined by the appended claims.

What is claimed is:

1. An image stabilization system configured to stabilize an image of an object at a focus position, comprising:
   a lens system configured to image the object at a plurality of focus positions, the lens system having a focal length range of between approximately 6 mm and 45 mm and an f-number range between approximately 2.8 and 4, the focal length and f-number ranges corresponding to the plurality of focus positions, the lens system comprising:
      a first liquid lens cell offset from a primary optical axis in a first direction, the first liquid lens cell comprising first and second contacting liquids, wherein a contacting optical surface between the contacting liquids has a variable shape that is substantially symmetrical to an optical axis of the first liquid lens cell and is asymmetrical to the primary optical axis;
      a second liquid lens cell offset from the primary optical axis in a second direction, the second liquid lens cell comprising first and second contacting liquids, wherein a contacting optical surface between the contacting liquids has a variable shape that is substantially symmetrical to an optical axis of the second liquid lens cell and is asymmetrical to the primary optical axis;
      a third liquid lens cell substantially centered on the primary optical axis, the third liquid lens cell comprising first and second contacting liquids, wherein a contacting optical surface between the contacting liquids has a variable shape; and
      a moveable lens cell substantially centered on the primary optical axis, the moveable lens being capable to axially move along the primary optical axis,
   wherein the first liquid lens cell and the offset of the first liquid lens cell from the primary optical axis provides image stabilization along an axis parallel to the first direction, the second liquid lens cell and the offset of the second liquid lens cell from the primary optical axis provides image stabilization along an axis parallel to the second direction, the third liquid lens cell compensates for changes in the focus position, and the moveable lens cell provides magnification during image stabilization having a magnification range of 7.5×.

2. The image stabilization system of claim 1, further comprising a sensor configured to detect movement of at least one lens element.

3. The image stabilization system of claim 2, further comprising a controller configured to vary the shape of the contacting surface of at least one of the first liquid lens cell, the second liquid lens cell, or the third liquid lens cell to compensate for movement of the at least one lens element and to provide stabilization of the image of the object.

4. The image stabilization system of claim 1, wherein the first direction is orthogonal to the second direction.

5. The image stabilization system of claim 1, wherein the first direction is opposite the second direction.

6. The image stabilization system of claim 1, wherein the optical axis of the first liquid lens cell is parallel to the primary optical axis.

7. The image stabilization system of claim 6, wherein the optical axis of the second liquid lens cell is parallel to the primary optical axis.

8. The image stabilization system of claim 1, wherein the primary optical axis passes through a portion of at least one of:
the first and second contacting liquids of the first liquid lens cell, and
the first and second contacting liquids of the second liquid lens cell.

9. An image stabilization system, comprising:
a lens system configured to image the object at a plurality of focus positions, the lens system having a focal length range of between approximately 6 mm and 45 mm and an f-number range between approximately 2.8 and 4, the focal length and f-number ranges corresponding to the plurality of focus positions, the lens system comprising:
a first liquid lens cell offset from a primary optical axis in a first direction, the first liquid lens cell comprising first and second contacting liquids, wherein a contacting optical surface between the contacting liquids has a variable shape that is substantially symmetrical to an optical axis of the first liquid lens cell and is asymmetrical to the primary optical axis;
a second liquid lens cell, the second liquid lens cell comprising first and second contacting liquids, wherein a contacting optical surface between the contacting liquids has a variable shape; and
a moveable lens cell substantially centered on the primary optical axis, the moveable lens being capable to axially move along the primary optical axis,
wherein the first liquid lens cell and the offset of the first liquid lens cell from the primary optical axis contributes to image stabilization along an axis parallel to the first direction, the second liquid lens cell contributes to focusing of radiation delivered to an image side space, and the moveable lens cell provides magnification during image stabilization having a magnification range of 7.5×.

10. The image stabilization system of claim 9, wherein the second liquid lens cell is offset in a second direction opposite from the first direction.

11. The image stabilization system of claim 9, wherein the second liquid lens cell is substantially centered on the primary optical axis.

12. The image stabilization system of claim 9, wherein the second liquid lens cell contributes to image stabilization along the axis parallel to the first direction.

13. The image stabilization system of claim 9, wherein the first liquid lens cell contributes to focusing of radiation delivered to an image side space.

14. The image stabilization system of claim 9, further comprising a sensor configured to detect movement of at least one lens element.

15. The image stabilization system of claim 14, further comprising a controller configured to vary the shape of the contacting surface of at least one of the first liquid lens cell or the second liquid lens cell to compensate for movement of the at least one lens element and to provide image stabilization of an image formed by the focusing of radiation delivered to the image side space.

16. The image stabilization system of claim 9, wherein the optical axis of the first liquid lens cell is parallel to the primary optical axis.

17. The image stabilization system of claim 9, wherein the optical axis of the first liquid lens cell is tilted with respect to the primary optical axis.

18. The image stabilization system of claim 9, wherein the primary optical axis passes through a portion of the first and second contacting liquids of the first liquid lens cell.

* * * * *

UNITED STATES PATENT AND TRADEMARK OFFICE
CERTIFICATE OF CORRECTION

PATENT NO. : 9,581,736 B2
APPLICATION NO. : 14/231085
DATED : February 28, 2017
INVENTOR(S) : Jannard et al.

Page 1 of 1

It is certified that error appears in the above-identified patent and that said Letters Patent is hereby corrected as shown below:

On the Title Page

Page 1 (item (57), Abstract) at Lines 6-7, Change "liquid lens cell may liquid lens cells may" to --liquid lens cell may--.

In Column 1 (page 3, item (56)) at Line 5, Under Other Publications, change "08837077.1" to --08837977.1--.

In the Specification

In Column 7 at Line 23 (approx.), Change "$y(X^2+Y^2)^{1/2}$" to --$y=(X^2+Y^2)^{1/2}$--.

In Column 17 at Line 29 (approx.), Change "$\kappa=-0.0000$" to --$\kappa=+0.0000$--.

In Column 17 at Line 37 (approx.), Change "$\kappa=-0.0000$" to --$\kappa=+0.0000$--.

In Column 24 at Line 5, After "art" insert --.--.

Signed and Sealed this
Sixth Day of June, 2017

Michelle K. Lee
*Director of the United States Patent and Trademark Office*